United States Patent
Fermann et al.

(10) Patent No.: US 9,653,868 B2
(45) Date of Patent: May 16, 2017

(54) PULSED LASER SOURCES

(71) Applicant: IMRA America, Inc., Ann Arbor, MI (US)

(72) Inventors: Martin E. Fermann, Dexter, MI (US); Ingmar Hartl, Ann Arbor, MI (US); Gennady Imeshev, Irvine, CA (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 15/207,959

(22) Filed: Jul. 12, 2016

(65) Prior Publication Data

US 2017/0063015 A1  Mar. 2, 2017

Related U.S. Application Data

(60) Continuation of application No. 14/090,374, filed on Nov. 26, 2013, now Pat. No. 9,401,579, which is a
(Continued)

(51) Int. Cl.
*G02F 1/35* (2006.01)
*H01S 3/10* (2006.01)
(Continued)

(52) U.S. Cl.
CPC .......... *H01S 3/0057* (2013.01); *G02F 1/3517* (2013.01); *H01S 3/0078* (2013.01);
(Continued)

(58) Field of Classification Search
None
See application file for complete search history.

(56) References Cited

U.S. PATENT DOCUMENTS

| | | |
|---|---|---|
| 3,409,843 A | 11/1968 | Bowness |
| 3,500,234 A | 3/1970 | Goedertier |

(Continued)

FOREIGN PATENT DOCUMENTS

| | | |
|---|---|---|
| EP | 0352974 | 1/1990 |
| EP | 0564098 | 10/1993 |

(Continued)

OTHER PUBLICATIONS

Apolonski, et al., "Controlling the Phase Evolution of Few-Cycle Light Pulses", Physical Review Letters, vol. 85, No. 4, Jul. 24, 2000, pp. 740-743.
(Continued)

*Primary Examiner* — Hemang Sanghavi
(74) *Attorney, Agent, or Firm* — Knobbe, Martens, Olson & Bear LLP

(57) ABSTRACT

Modelocked fiber laser resonators may be coupled with optical amplifiers. An isolator optionally may separate the resonator from the amplifier. A reflective optical element on one end of the resonator having a relatively low reflectivity may be employed to couple light from the resonator to the amplifier. Enhanced pulse-width control may be provided with concatenated sections of both polarization-maintaining and non-polarization-maintaining fibers. Apodized fiber Bragg gratings and integrated fiber polarizers may also be included in the laser cavity to assist in linearly polarizing the output of the cavity. Very short pulses with a large optical bandwidth may be obtained by matching the dispersion value of the grating to the inverse of the dispersion of the intra-cavity fiber. Frequency comb sources may be constructed from such modelocked fiber oscillators. Low dispersion and an in-line interferometer that provides feedback may assist in controlling the frequency components output from the comb source.

34 Claims, 18 Drawing Sheets

Related U.S. Application Data continuation of application No. 13/907,191, filed on May 31, 2013, now Pat. No. 8,599,473, which is a continuation of application No. 13/526,137, filed on Jun. 18, 2012, now Pat. No. 8,456,735, which is a division of application No. 12/687,807, filed on Jan. 14, 2010, now Pat. No. 8,208,196, which is a division of application No. 11/372,859, filed on Mar. 10, 2006, now Pat. No. 7,649,915, which is a division of application No. 10/814,502, filed on Mar. 31, 2004, now Pat. No. 7,190,705, said application No. 11/372,859 is a continuation-in-part of application No. 10/627,069, filed on Jul. 25, 2003, now Pat. No. 7,088,756.

(60) Provisional application No. 60/519,447, filed on Nov. 12, 2003.

(51) Int. Cl.
  H01S 3/00    (2006.01)
  H01S 3/067   (2006.01)
  H01S 3/11    (2006.01)
  H01S 3/106   (2006.01)

(52) U.S. Cl.
  CPC ............ *H01S 3/0092* (2013.01); *H01S 3/067* (2013.01); *H01S 3/106* (2013.01); *H01S 3/1106* (2013.01); *G02F 2001/3528* (2013.01)

(56) References Cited

U.S. PATENT DOCUMENTS

| | | |
|---|---|---|
| 3,584,312 A | 6/1971 | Statz |
| 3,729,690 A | 4/1973 | Snitzer |
| 3,801,931 A | 4/1974 | Heflinger et al. |
| 3,928,818 A | 12/1975 | White |
| 3,973,828 A | 8/1976 | Onoda et al. |
| 3,978,429 A | 8/1976 | Ippen et al. |
| 4,191,473 A | 3/1980 | Hänsch |
| 4,451,923 A | 5/1984 | Hänsch et al. |
| 4,700,150 A | 10/1987 | Hall et al. |
| 4,713,821 A | 12/1987 | Bradford et al. |
| 4,787,927 A | 11/1988 | Mears et al. |
| 4,860,296 A | 8/1989 | Chemla et al. |
| 4,864,577 A | 9/1989 | Aoshima et al. |
| 4,991,923 A | 2/1991 | Kino et al. |
| 5,003,550 A | 3/1991 | Welch et al. |
| 5,005,175 A | 4/1991 | Desurvire et al. |
| 5,008,887 A | 4/1991 | Kafka et al. |
| 5,050,183 A | 9/1991 | Duling, III |
| 5,067,134 A | 11/1991 | Oomen |
| 5,079,444 A | 1/1992 | Kallenbach et al. |
| 5,136,598 A | 8/1992 | Weller et al. |
| 5,163,059 A | 11/1992 | Negus et al. |
| 5,189,676 A | 2/1993 | Wysocki et al. |
| 5,222,089 A | 6/1993 | Huber |
| 5,226,049 A | 7/1993 | Grubb |
| 5,272,560 A | 12/1993 | Baney et al. |
| 5,303,314 A | 4/1994 | Duling, III et al. |
| 5,311,603 A | 5/1994 | Fidric |
| 5,359,612 A | 10/1994 | Dennis et al. |
| 5,361,161 A | 11/1994 | Baney et al. |
| 5,363,386 A | 11/1994 | Smith |
| 5,379,309 A | 1/1995 | Logan, Jr. |
| 5,400,350 A | 3/1995 | Galvanauskas |
| 5,414,725 A | 5/1995 | Fermann et al. |
| 5,422,897 A | 6/1995 | Wyatt et al. |
| 5,436,925 A | 7/1995 | Lin et al. |
| 5,448,579 A | 9/1995 | Chang et al. |
| 5,450,427 A | 9/1995 | Fermann et al. |
| 5,473,622 A | 12/1995 | Grubb |
| 5,479,422 A | 12/1995 | Fermann et al. |
| 5,499,134 A | 3/1996 | Galvanauskas et al. |
| 5,513,194 A | 4/1996 | Tamura et al. |
| 5,574,738 A | 11/1996 | Morgan |
| 5,585,913 A | 12/1996 | Hariharan et al. |
| 5,617,434 A | 4/1997 | Tamura et al. |
| 5,627,848 A | 5/1997 | Fermann et al. |
| 5,633,885 A | 5/1997 | Galvanauskas et al. |
| 5,659,558 A | 8/1997 | Tohmon et al. |
| 5,663,731 A | 9/1997 | Theodoras, II et al. |
| 5,666,372 A | 9/1997 | Ball et al. |
| 5,666,373 A | 9/1997 | Sharp et al. |
| 5,677,769 A | 10/1997 | Bendett |
| 5,689,519 A | 11/1997 | Fermann et al. |
| 5,696,782 A | 12/1997 | Harter et al. |
| 5,701,319 A | 12/1997 | Fermann |
| 5,748,309 A | 5/1998 | Van der Weide |
| 5,778,016 A | 7/1998 | Sucha |
| 5,818,630 A | 10/1998 | Fermann et al. |
| 5,844,927 A | 12/1998 | Kringlebotn |
| 5,847,863 A | 12/1998 | Galvanauskas et al. |
| 5,861,970 A | 1/1999 | Tatham et al. |
| 5,862,287 A | 1/1999 | Stock et al. |
| 5,867,304 A | 2/1999 | Galvanauskas et al. |
| 5,880,877 A | 3/1999 | Fermann et al. |
| 5,920,668 A | 7/1999 | Uehara et al. |
| 5,923,686 A | 7/1999 | Fermann et al. |
| 5,959,735 A | 9/1999 | Maris et al. |
| 6,014,249 A | 1/2000 | Fermann et al. |
| 6,020,591 A | 2/2000 | Harter et al. |
| 6,034,975 A | 3/2000 | Harter et al. |
| 6,038,055 A | 3/2000 | Hansch |
| 6,072,811 A | 6/2000 | Fermann et al. |
| 6,097,741 A | 8/2000 | Lin et al. |
| 6,144,677 A | 11/2000 | Komine et al. |
| 6,154,310 A | 11/2000 | Galvanauskas et al. |
| 6,181,463 B1 | 1/2001 | Galvanauskas et al. |
| 6,188,705 B1 | 2/2001 | Krainak et al. |
| 6,192,058 B1 | 2/2001 | Abeles |
| 6,198,568 B1 | 3/2001 | Galvanauskas et al. |
| 6,208,458 B1 | 3/2001 | Galvanauskas et al. |
| 6,236,779 B1 | 5/2001 | Kafka et al. |
| 6,249,630 B1 | 6/2001 | Stock et al. |
| 6,252,892 B1 | 6/2001 | Jiang et al. |
| 6,275,512 B1 | 8/2001 | Fermann |
| 6,295,308 B1 | 9/2001 | Zah |
| 6,298,074 B1 | 10/2001 | Jeon et al. |
| 6,320,885 B1 | 11/2001 | Kawai et al. |
| 6,334,011 B1 | 12/2001 | Galvanauskas et al. |
| 6,373,867 B1 | 4/2002 | Lin et al. |
| 6,389,198 B2 | 5/2002 | Kafka et al. |
| 6,393,035 B1 | 5/2002 | Weingarten et al. |
| 6,396,856 B1 | 5/2002 | Sucha |
| 6,546,169 B1 | 4/2003 | Lin |
| 6,549,547 B2 | 4/2003 | Galvanauskas et al. |
| 6,567,438 B2 | 5/2003 | Lin |
| 6,570,704 B2 | 5/2003 | Palese |
| 6,570,892 B1 | 5/2003 | Lin et al. |
| 6,590,910 B2 | 7/2003 | Lin |
| 6,603,910 B2 | 8/2003 | Islam et al. |
| 6,643,299 B1 | 11/2003 | Lin |
| 6,654,394 B1 | 11/2003 | Sellin et al. |
| 6,724,788 B1 | 4/2004 | Holzwarth et al. |
| 6,738,408 B2 | 5/2004 | Abedin |
| 6,751,385 B2 | 6/2004 | Futami |
| 6,785,303 B1 | 8/2004 | Holzwarth |
| 6,813,429 B2 | 11/2004 | Price et al. |
| 6,813,447 B2 | 11/2004 | Ellis et al. |
| 6,814,376 B2 | 11/2004 | Yu |
| 6,816,515 B1 | 11/2004 | Yun et al. |
| 6,816,652 B1 | 11/2004 | Lin |
| 6,819,690 B2 | 11/2004 | Kartner |
| 6,839,363 B2 | 1/2005 | Lin |
| 6,845,108 B1 | 1/2005 | Liu |
| 6,885,683 B1 | 4/2005 | Fermann et al. |
| 6,897,959 B2 | 5/2005 | Häensch et al. |
| 7,026,594 B2 | 4/2006 | Holzwarth et al. |
| 7,088,756 B2 | 8/2006 | Fermann et al. |
| 7,190,705 B2 | 3/2007 | Fermann |
| 7,202,993 B2 | 4/2007 | Tauser |
| 7,203,402 B2 | 4/2007 | Haensch |

(56) References Cited

U.S. PATENT DOCUMENTS

| | | | |
|---|---|---|---|
| 7,218,443 B2 | 5/2007 | Tauser | |
| 7,224,518 B2 | 5/2007 | Tauser | |
| 7,605,371 B2 | 10/2009 | Yasui et al. | |
| 7,649,915 B2 | 1/2010 | Fermann et al. | |
| 7,809,222 B2 | 10/2010 | Hartl et al. | |
| 8,208,196 B2 | 6/2012 | Fermann et al. | |
| 8,456,735 B2 | 6/2013 | Fermann et al. | |
| 8,599,473 B2 | 12/2013 | Fermann et al. | |
| 9,401,579 B2 | 7/2016 | Fermann et al. | |
| 2001/0034089 A1 | 10/2001 | Yamazaki et al. | |
| 2002/0071454 A1 | 6/2002 | Lin | |
| 2002/0072142 A1 | 6/2002 | Ooi et al. | |
| 2002/0105711 A1 | 8/2002 | Kaneko | |
| 2002/0146047 A1 | 10/2002 | Bendett et al. | |
| 2002/0168161 A1 | 11/2002 | Price et al. | |
| 2002/0172486 A1 | 11/2002 | Fermann et al. | |
| 2003/0147434 A1 | 8/2003 | Hong et al. | |
| 2003/0156605 A1 | 8/2003 | Richardson et al. | |
| 2003/0169797 A1 | 9/2003 | Aldaz et al. | |
| 2003/0174379 A1 | 9/2003 | Gupta | |
| 2004/0017833 A1 | 1/2004 | Cundiff | |
| 2004/0057682 A1 | 3/2004 | Nicholson et al. | |
| 2004/0213302 A1 | 10/2004 | Fermann et al. | |
| 2004/0263950 A1 | 12/2004 | Fermann et al. | |
| 2005/0018714 A1 | 1/2005 | Fermann et al. | |
| 2005/0041702 A1 | 2/2005 | Fermann et al. | |
| 2005/0047739 A1 | 3/2005 | Parker | |
| 2005/0063425 A1 | 3/2005 | Krastev et al. | |
| 2005/0111500 A1 | 5/2005 | Harter et al. | |
| 2005/0146779 A1 | 7/2005 | Okhotnikov et al. | |
| 2005/0163426 A1 | 7/2005 | Fermann et al. | |
| 2005/0169324 A1 | 8/2005 | Ilday et al. | |
| 2005/0226278 A1 | 10/2005 | Gu et al. | |
| 2005/0226286 A1 | 10/2005 | Liu et al. | |
| 2005/0226575 A1 | 10/2005 | Brown | |
| 2005/0238070 A1 | 10/2005 | Imeshev et al. | |
| 2005/0286108 A1 | 12/2005 | Xu | |
| 2006/0268949 A1 | 11/2006 | Gohle | |
| 2007/0086713 A1 | 4/2007 | Ingmar | |
| 2008/0069159 A1 | 3/2008 | Adel | |
| 2010/0098117 A1 | 4/2010 | Fermann et al. | |
| 2010/0284430 A1 | 11/2010 | Lasri et al. | |
| 2011/0261363 A1 | 10/2011 | Picque et al. | |
| 2014/0185635 A1* | 7/2014 | Cox | H01S 3/1307 372/18 |
| 2016/0226216 A1* | 8/2016 | Schilt | H01S 3/1118 |

FOREIGN PATENT DOCUMENTS

| | | |
|---|---|---|
| JP | 56-165385 | 12/1981 |
| JP | 10022555 A | 1/1998 |
| WO | WO 02/21644 A2 | 3/2002 |
| WO | WO 02/21644 A3 | 3/2002 |
| WO | WO 2004/077142 | 9/2004 |
| WO | WO 2007/079342 A2 | 7/2007 |

OTHER PUBLICATIONS

Barnett, et al., "High-power erbium-doped fiber laser mode locked by a semiconductor saturable absorber," Optics Letters, vol. 20, No. 5, Mar. 1995, pp. 471-473.
Cundiff et al., "Colloquium: Femtosecond optical frequency combs", Review of Modern Physics, vol. 75, Jan. 2003, pp. 325-342.
Cundiff, et al., "Femtosecond combs linewidth due to pulse dynamics in mode-locked laser" ThD4 (Invited), LEOS 2007, pp. 719-720, Oct. 21-25, 2007.
Cundiff, et al., "Optical frequency synthesis based on mode-locked lasers", Review of Scientific Instruments, vol. 72, No. 10, Oct. 2001, pp. 3749-3771.
Delfyett, et al., "Ultrafast Modelocked Semiconductor Lasers", in chapter 5 of "Ultrafast Lasers, Technology and Applications", M.E. Fermann, et al., eds. 2003 Marcel Dekker publisher.
DeSouza, et al., "Saturable absorber modelocked polarization maintaining erbium-doped fibre laser", Electron. Lett, vol. 29, No. 5, pp. 447-449, (1993).
Desurvire, et al., "High-gain erbium-doped traveling-wave fiber amplifier," Optics Letters, vol. 12, No. 11, Nov. 1987, pp. 888-890.
Diddams, Scott A., et al., "Direct RF of optical frequency measurements with a Femtosecond Laser comb" IEEE transactions on instrumentation and measurement, vol. 50, No. 2, Apr. 2001 pp. 552-555.
Duling, III, "Compact sources of ultrashort pulses," date unknown, pp. 179-207. Copy not available.
Duling, III, et al., "A Single-Polarization Er-Doped Fiber Amplifier," believed to have been presented at a conference on Lasers and Electro-Optics, vol. 12 of 992 OSA Tech. Digest Series, paper CPDP 28. (1992), pp. 694-695.
Duling, III, et al., "Single-Polarisation Fibre Amplifier," Electronics Letters, vol. 28, No. 12, Jun. 4, 1992, pp. 1126-1128.
Duling, III. "All-fiber ring soliton laser mode locked with a nonlinear mirror," Optics Letters, vol. 16, No. 8, Apr. 15, 1991, pp. 539-541.
Ebendorff-Heidepriem et al., "Highly nonlinear bismuth-oxide-based glass holey fiber", OFC 2004, paper ThA4, Feb. 22, 2004.
Fatemi, F.K., et al., "Frequency comb linewidth of an actively mode-locked fiber laser" 2003 Optical Society of America.
Fermann, "Ultrashort-Pulse Sources Based on Single-Mode Rare-Earth-Doped Fibers," Applied Physics B, vol. 58, 1994, pp. 197-209.
Fermann, et al., "Additive-pulse-compression mode locking of a neodymium fiber laser," Optical Letters, vol. 16, No. 4, Feb. 15, 1991, pp. 244-246.
Fermann, et al., "Environmentally stable Kerr-type mode-locked erbium fiber laser producing 360-fs pulses," Optics Letters, vol. 19, No. 1, Jan. 1, 1994, pp. 43-45.
Fermann, et al., "Passive mode locking by using nonlinear polarization evolution in a polarization-maintaining erbium-doped fiber," Optics Letters, vol. 18, No. 11, Jun. 1, 1993, pp. 894-896.
Fermann, et al., "Passive mode locking in erbium fiber lasers with negative group delay," Appl. Phys. Letter, vol. 62, Mar. 1, 1993, pp. 910-912.
Harter, et al., "Low-magnification unstable resonators used with ruby and alexandrite lasers," Optics Letters, vol. 11, No. 11, Nov. 1986, pp. 706-708.
Harter, et al., "Short pulse amplification in tunable solid state materials," SPIE, vol. 1229, 1990, pp. 19-28.
Hofer, et al., "Mode locking with cross-phase and self-phase modulation," Optics Letters, vol. 16, No. 7, Apr. 1, 1991, pp. 502-504.
Hofer, et al., "Characterization of Ultrashort Pulse Formation in Passively Mode-Locked Fiber Lasers." IEEE Journal of Quantum Electronics, vol. 28, No. 3, Mar. 1992, pp. 720-728.
Holman, Kevin W., "Detailed studies and control of intensity-related dynamics of femtosecond frequency combs from mode-locked Ti:Sapphire Lasers", IEEE Journal of selected topics in quantum electronics, vol. 9, No. 4, Jul./Aug. 2003, pp. 1018-1024.
Hong et al., "Broad-spectrum frequency comb generation and carrier-envelope offset frequency measurement by second-harmonic generation of a mode-locked fiber laser," Optics Letters, vol. 28, No. 17, Sep. 1, 2003, pp. 1516-1518.
Hopfel, et al. , "Intraband inversion due to ultrashort carrier lifetimes in proton-bombarded InP" Appl. Phys. B., vol. 53, No. 19, p. 12851 (1996).
Ilday, et al., "Practical all-fiber source of high power, 120 fs pulses at 1Φm", Opt. Lett, vol. 28, No. 15, p. 1362, Aug. 1, 2003.
Ippen, et al., "Additive pulse mode locking,"Optical Society of America, vol. 6, No. 9, Sep. 1989, pp. 1736-1745.
Islam, et al., "Color Center Lasers Passively Mode Locked by Quantum Wells", IEEE J. Quantum Electron., vol. 25, pp. 2545-2463 (1989).
Jones, et al., "Carrier-envelope phase control of femtosecond modelocked lasers and direct optical frequency synthesis", Science Mag., pp. 635-639, Apr. 28, 2000.
Jones, et al., "Stabilization of Femtosecond Lasers for Optical Frequency Metrology and Direct Optical to Radio Frequency Synthesis", Physical Review Letters vol. 86, pp. 3288-3291 (2001).

(56) References Cited

OTHER PUBLICATIONS

Kado, et al., "Broadband flat-noise amplifier using low-noise bi-directionally pumping sources". European Conference on Optical Communication, ECOC (2001).

Keilmann, et al., "Time domain mid-infrared frequency-comb spectrometer", Opt. Lett., vol. 29, pp. 1542-1544 (2004).

Kelly, "Characteristic sideband instability of the periodically amplified average soliton," Electronic Letters, vol. 28, No. 8, Apr. 9, 1992, 1992, pp. 806-807.

Koester, et al., "Amplification in a Fiber Laser," *Applied Optics*, vol. 3, No. 10, Oct. 1964, pp. 1182-1186.

Krasinski, et al., "Multipass Amplifiers Using Optical Circulators," IEEE Journal of Quantum Electronics, vol. 26, No. 5, May 1990, pp. 950-958.

Krausz, et al., "Passive mode locking in standing-wave laser resonators," Optics Letters, vol. 18, No. 11, Jun. 1, 1993, pp. 888-890.

Kikuchi, K., et al., "Highly-nonlinear Bismuth Oxide based glass fibers for all-optical signal processing" Thursday Afternoon/OFC 2002/ pp. 567-568.

Kikuchi, K., et al., "Highly-nonlinear Bismuth Oxide based glass fibers for all-optical signal processing" Electronics Letters, Feb. 14, 2002, vol. 38, No. 4, pp. 166-167.

Ledered, M.J., et al. Diode-pumped Femtosecond Yb: YAl2(BO3)4 Laser passively Mode-locked by an Ion-implanted SESAM, CLEO 2002/Wednesday Afternoon pp. 334-335.

Loh, et al. "Diode-Pumped Selfstarting Passively Modelocked Neodymium-Doped Fibre Laser," *Electronics Letters*, vol. 29, No. 9, Apr. 29, 1993, pp. 808-810.

Loh, et al., "All-solid-state subpicosecond passively mode locked erbium-doped fiber laser," *Applied Physics Letters*, vol. 63, No. 1, Jul. 5, 1993, pp. 4-6.

Luis A. Gomez, et al. "Picosecond SESAM-Baed Ytterbium Mode-Locked Fiber Laser", IEEE Journal of selected topic in Quantum electronics, vol. 10, No. 1, Jan./Feb. 2004, pp. 129.136.

M. Jiang, et al, "Synchronization of Passively Mode-Locked Erbium-Doped Fiber Laser and Its Application to Optical Communication Networks", Journal of Lightwave Technology, vol. 15, No. 11, Nov. 1997. pp. 2020-20-2020-28.

Manni, "Two-Photon Excitation Expands the Capabilities of Laser-Scanning Microscopy," *Biophotonics International*, Jan./Feb. 1996, pp. 44-48, 50 and 52.

Matsas, et al., "Self-Starting Passively Mode-Locked Fabry-Perot Fiber Soliton Laser Using Nonlinear Polarization Evolution," IEEE Photonics Technology Letters, vol. 5, No. 5, May 5, 1993, pp. 492-494.

Menyuk, "Stability of solitons in birefringent optical fibers. II. Arbitrary amplitudes," Optical Society of America, vol. 5, No. 2, Feb. 1988, pp. 392-402.

Minoshima, Kaoru et al., "Femtosecond-comb distance meter: ultrahigh-resolution distance measurement using a mode-locked laser" THB-(10)-1 p. 394.

Morioka, et al., "Ultrafast Reflective Optical Kerr Demultiplexer Using Polarisation Rotation Mirror," *Electronics Letters*, vol. 28, No. 6, Mar. 12, 1992, pp. 521-522.

O.G. Okhotnikov, et al. "980 nm Picosecond Fiber Laser" IEEE Photonic Technology Letters, vol. 15, No. 11, Nov. 2003, pp. 1519-1521.

Ober, et al., "42-fs pulse generation from a mode-locked fiber laser started with a moving mirror," Optics Letters, vol. 18, No. 5, Mar. 1, 1993, pp. 367-369.

Ober, et al., "Self-starting diode-pumped femtosecond Nd fiber laser", *Optics Letters*, vol. 18, No. 18, Sep. 15, 1993, pp. 1532-1534.

PCT Search Report and Written Opinion of International Searching Authority for International Appl. No. PCT/US04/17458, dated Mar. 14, 2005.

Poole, et al., "Fabrication of Low-Loss Optical Fibres Containing Rare-Earth Ions," Electronics Letters, vol. 21, No. 17, Aug. 15, 1985, pp. 737-738.

Rauschenberger et al., "Control of the frequency comb from a mode-locked Erbium-doped fiber laser," Optics Express, vol. 10, No. 24, Dec. 2, 2002, pp. 1404-1410.

Reddy, et al., "A Turnkey 1.5 :m Picosecond Er/Yb Fiber Laser," Conference on Optical Fiber Communication, OFC, paper PD17, 1993. Copy not available.

Shi, Chan-Xiang, "A novel Er-dobed fiber laser with adjustable pulse output experiment", Microwave and Optical Technology Letters, vol. 12, No. 1, May 1996, pp. 26-29.

Snitzer, "Proposed Fiber Cavities for Optical Masers," Journal of Applied Physics, vol. 32, No. 1, Jan. 1961, pp. 36-39.

Stewart, Dr. George, "A modelocking fiber laser system for Multi-Point Intra Cavity Gas Spectroscopy", OFS 2002, pp. 1-6.

Tamura, et al., "77-fs pulse generation from a stretched-pulse mode-locked all fiber ring laser," Optics Letters, vol. 18, No. 13, Jul. 1, 1993, pp. 1080-1082.

Tamura, et al., "Unidirectional ring resonators for self-starting passively mode-locked lasers," Optics Letters, vol. 18, No. 3, Feb. 1, 1993, pp. 220-222.

Tauser, et al., "Amplified femtosecond pulses from an Er::fiber system: nonlinear pulse shortening and self-referencing detection of the carrier-envelope phase evolution", Opt. Express, vol. 11, No. 6, pp. 594-600 (2003).

Taverner, et al., "Polarisation Maintaining Figure-8 Laser," believed to have been presented at the Optical Society America Topical Meeting on Nonlinear Guided Wave Phenomena, Cambridge, England, Sep. 20-22, 1993, paper WC3, pp. 367-370 and pp. 1-4.

Valentine, et al. "Femtosecond Yb:YCOB laser pumped by narrow-stripe laser diode and passively modelocked using ion implanted saturable-absorber mirror" Electronic Letters, Sep. 14, 2000, vol. 36, No. 19, pp. 1621-1623.

Walling, et al., "Tunable Alexandrite Lasers: Development and Performance," IEEE Journal of Quantum Electronics, vol. QE-21, No. 10, Oct. 1985, pp. 1568-1581.

Washburn et al., "A Phase Locked Frequency Comb from an All-Fiber Supercontinuum Source," The 29th European Conference on Optical Communications, Sep. 22-24, 2003, Rimini, Italy (2003).

Washburn, et al., "An all-fiber, phase-locked supercontinuum source for frequency metrology", Opt. Soc., Am., Annual meeting, paper PDP7, (2003).

Fermann et al., "Wavelength-tunable soliton generation in the 1400-1600 nm region using an Yb fiber laser," OFC 2001, vol. 2, pp. Tu12-1 to Tu12-3, Mar. 17, 2001.

Khan, et al. "Broadband Supercontinuum Generation with Excellent Spectral Stability from a Highly-Nonlinear Fibre using an Amplified Noiselike-Pulse Train", ECOC 2005, Proceedings, vol. 1, Paper MO3.5.5, pp. 61-62, Sep. 25-29, 2005.

Leon-Saval, S.G., et al., "Efficient single-mode supercontinuum generation in submicron-diameter silica-air fibre waveguides", CLEO 2004, vol. 2, paper CPDA6, pp. 1010-1011, May 16-21, 2004.

Rulkov, A.B. et al., "525-1800nm, Watt-level, all-fibre picosecond source", CLEO 2004, paper CPCD7, vol. 2, pp. 1056-1057, May 16-21, 2004.

A. Bartels et al., "Broadband phase-coherent optical frequency synthesis with actively linked Ti:sapphire and Cr:forsterite femtosecond lasers," Optics Letters, vol. 29, No. 4, Feb. 15, 2004, pp. 403-405.

A. S. Bhushan et al. "150G sample/s wavelength division sampler with time-stretched output," Electronics Letters, vol. 34, No. 5, Mar. 5, 1998, pp. 474-475.

S. Diddams et al., "A phase and frequency controlled femtosecond laser for metrology and single-cycle nonlinear optics", Advanced Solid State Lasers, 2000 Technical Digest, Optical Society of America, pp. 631-633.

S. Diddams et al., "An Optical Clock Based on a Single Trapped 199Hg+ Ion", Science, vol. 293, Aug. 3, 2001, pp. 825-828.

T. W. Hansch et al., "Laser frequency stabilization by polarization spectroscopy of a reflecting reference cavity," Optics Communications, vol. 35, No. 3, Dec. 1980, pp. 441-444.

A. Poppe et al., "Few-cycle optical waveform synthesis", Applied Physics B: Lasers and Optics, vol. 72, Dec. 13, 2000, pp. 373-376.

(56) References Cited

OTHER PUBLICATIONS

H. R. Telle et al. "Carrier-envelope offset phase control," Applied Physics B: Lasers and Optics, vol. 69, Sep. 8, 1999, pp. 327-332.
T. Udem, "Phasenkohärente optische Frequenzmessungen am Wasserstoffatom. Bestimmung der Rydberg-Konstanten und der 1S Lamb-Verschiebung", Dissertation, Ludwig-Maximilians-Universitat, Munchen, Germany, Aug. 14, 1997, in 137 pages.
T. Udem, Highlighted Chapter 8 "Ausblick", of "Phasenkohärente optische Frequenzmessungen am Wasserstoffatom. Bestimmung der Rydberg-Konstanten und der 1S Lamb-Verschiebung" Ludwig-Maximilians-Universitat, Munchen, Germany, Aug. 14, 1997, in 18 pages.
L. Xu et al., "Route to phase control of ultrashort light pulses", Optics Letters, vol. 21, No. 24, Dec. 15, 1996, pp. 2008-2010.
Yasui T., et al., "Terahertz frequency comb by multifrequency-heterodyning photoconductive detection for high-accuracy, high-resolution terahertz spectroscopy," Appl. Phys. Lett., vol. 88, pp. 241104-1 to 241104-3, published online Jun. 13, 2006.
Hudson, D., "Mode-locked fiber laser frequency-controlled with an intracavity electro-optic modulator," Optics Letters, vol. 30 No. 21, pp. 2948-2950, Nov. 1, 2005.
Telle, H. R., et al. "Kerr-lens mode-locked lasers as ultra-low noise microwave sources," Precision Electromagnetic Measurements Digest. pp. 507-508, IEEE, May 2000.

\* cited by examiner

PULSED LASER SOURCES

CROSS-REFERENCE TO RELATED APPLICATIONS

This application is a continuation of U.S. patent application Ser. No. 14/090,374, filed Nov. 26, 2013, entitled "PULSED LASER SOURCES," now U.S. Pat. No. 9,401,579, which is hereby incorporated by reference in its entirety; U.S. patent application Ser. No. 14/090,374 is a continuation of U.S. patent application Ser. No. 13/907,191, filed May 31, 2013, entitled "PULSED LASER SOURCES," now U.S. Pat. No. 8,599,473, which is hereby incorporated by reference in its entirety; U.S. patent application Ser. No. 13/907,191 is a continuation of U.S. patent application Ser. No. 13/526,137, filed Jun. 18, 2012, entitled "PULSED LASER SOURCES," now U.S. Pat. No. 8,456,735, which is hereby incorporated by reference in its entirety; U.S. patent application Ser. No. 13/526,137 is a divisional of U.S. patent application Ser. No. 12/687,807, filed Jan. 14, 2010, entitled "PULSED LASER SOURCES," now U.S. Pat. No. 8,208,196, which is hereby incorporated by reference in its entirety; U.S. patent application Ser. No. 12/687,807 is a divisional of U.S. patent application Ser. No. 11/372,859 filed Mar. 10, 2006 and entitled "PULSED LASER SOURCES," now U.S. Pat. No. 7,649,915, which is hereby incorporated by reference in its entirety; U.S. patent application Ser. No. 11/372,859 is a divisional of U.S. patent application Ser. No. 10/814,502 filed Mar. 31, 2004 and entitled "PULSED LASER SOURCES," now U.S. Pat. No. 7,190,705, which is hereby incorporated by reference in its entirety; U.S. patent application Ser. No. 10/814,502 also claims the benefit of U.S. Provisional Patent Application No. 60/519,447 filed Nov. 12, 2003 entitled "POLARIZATION MAINTAINING DISPERSION CONTROLLED FIBER LASER SOURCE OF ULTRASHORT PULSES," which is incorporated herein by reference in its entirety. U.S. patent application Ser. No. 11/372,859 is also a continuation-in-part of U.S. patent application Ser. No. 10/627,069, filed Jul. 25, 2003, entitled "POLARIZATION MAINTAINING DISPERSION CONTROLLED FIBER LASER SOURCE OF ULTRASHORT PULSES," published as U.S. Patent Application Publication No. 2005/0018714 A1, now U.S. Pat. No. 7,088,756, which is hereby incorporated by reference herein in its entirety.

BACKGROUND

Field

The present teachings relate to modelocked fiber lasers and amplifiers, such as for example, ultra-compact high power integrated fiber lasers with pulse width controlled and with concatenated sections of polarization maintaining fiber, as well as potential applications such as precision metrology.

Description of the Related Art

Modelocked fiber lasers offer advantages over traditional solid-state lasers for ultrafast optic applications. Modelocked fiber lasers can potentially be packaged in very small spaces and may also exhibit superior mechanical and thermal stability; see for example Femtolite™ Series made available by IMRA™ America, Inc, Ann Arbor, Mich. In particular, passively modelocked fiber lasers may allow compact designs because of the absence of bulky optical modulators.

To compete on an equal level with modelocked solid state lasers in ultrafast optics applications, however, modelocked fiber lasers preferably include the following features: 1) the output polarization state should preferably be well defined, 2) the construction of the fiber laser should preferably be adaptable to mass production, 3) the required optical elements should preferably be inexpensive, 4) the design concept should preferably comprise saturable absorbers with well controllable parameters and 5) implementing pulse amplification preferably be simple. These factors are important in the design of modelocked fiber lasers, and there is an ongoing need for improvements in such devices.

SUMMARY

One embodiment of the present invention comprises a master oscillator power amplifier comprising a mode-locked fiber oscillator and a fiber amplifier. The mode-locked fiber oscillator comprises a pair of reflective optical elements that form an optical resonator. At least one of the reflective optical elements is partially transmissive and has a reflection coefficient that is less than about 60%. The mode-locked fiber oscillator outputs a plurality of optical pulses. The fiber amplifier is optically connected to the mode-locked fiber oscillator through a bi-directional optical connection such that light from the mode-locked fiber oscillator can propagate to the fiber amplifier and light from the fiber amplifier can propagate to the mode-locked fiber oscillator.

Another embodiment of the present invention comprises a method of producing laser pulses. In this method, optical energy is propagated back and forth through a gain fiber by reflecting light from a pair of reflective elements on opposite ends of the gain fiber. Less than about 60% of the light in the gain fiber is reflected back into the gain fiber by one of the reflectors. The pair of reflective elements together form a resonant cavity that supports a plurality of resonant optical modes. The resonant optical modes are substantially mode-locking to produce a train of pulses. The train of optical pulses is propagated from the laser cavity through one of the reflectors to a fiber amplifier along a bi-directional optical path from the laser cavity to the fiber amplifier where the laser pulses are amplified.

Another embodiment of the present invention comprises a fiber-based master oscillator power amplifier comprising a mode-locked fiber oscillator, a fiber amplifier comprising a gain fiber, and bi-directional optical path between the mode-locked fiber oscillator and the fiber amplifier. The mode-locked fiber oscillator comprises a resonant cavity and a gain medium. The mode-locked fiber oscillator produces a plurality of optical pulses. The bi-directional optical path between the mode-locked fiber oscillator and the fiber amplifier permits light from the mode-locked fiber oscillator to propagate to the fiber amplifier and light from the fiber amplifier to propagate to the mode-locked fiber oscillator. The mode-locked fiber oscillator comprises a first segment of fiber and the fiber amplifier comprise a second segment of optical fiber. The first and second segments form a substantially continuous length of optical fiber. In some embodiments, the first and second segments are spliced together. The first and second segments may be fusion spliced. The first and second segments may also be butt coupled together with or without a small gap, such as a small air gap, between the first and second segments.

Another embodiment of the present invention comprises a method of producing laser pulses comprising substantially mode-locking longitudinal modes of a laser cavity to produce laser pulses and propagating the laser pulses from the laser cavity to a fiber amplifier. The laser pulses are amplified in the fiber amplifier. Amplified spontaneous emission emitted from the fiber amplifier is received at the laser cavity. A first portion of the spontaneous emission enters the laser cavity. A second portion of the amplified spontaneous emission from the laser cavity is retro-reflecting back to the fiber amplifier to cause the second portion to be directed away from the cavity toward the fiber amplifier.

Another embodiment of the present invention comprises a fiber master oscillator power amplifier comprising a mode-locked fiber oscillator and a fiber amplifier. The mode-locked fiber oscillator comprises a first portion of optical fiber and a pair of reflectors spaced apart to form a fiber optic resonator in the first fiber portion. At least one of the fiber reflectors comprises a partially transmissive fiber reflector. The mode-locked fiber oscillator outputs a plurality of optical pulses. The fiber amplifier comprises a second portion of optical fiber optically connected to the partially transmissive fiber reflector to receive the optical pulses from the mode-locked oscillator. The second portion of optical fiber has gain to amplify the optical pulses. The first portion of optical fiber, the partially transmissive fiber reflector, and the second portion of optical fiber comprise a continuous path formed by optical fiber uninterrupted by non-fiber optical components.

Another embodiment of the present invention comprises a master oscillator power amplifier comprising a mode-locked fiber oscillator and a fiber amplifier. The mode-locked fiber oscillator comprises a pair of reflective optical elements that form an optical resonator. At least one of the reflective optical elements comprises a partially transmissive Bragg fiber grating having a reflection coefficient that is less than about 60%. The mode-locked fiber oscillator outputs a plurality of optical pulses. A fiber amplifier is optically connected to the oscillator through an optical connection to the partially transmissive Bragg fiber grating.

Another embodiment of the present invention comprises a master oscillator power amplifier comprising a mode-locked fiber oscillator, a fiber amplifier, and a pump source. The mode-locked fiber oscillator comprises a pair of reflective optical elements that form an optical resonator. At least one of the reflective optical elements is partially transmissive and has a reflection coefficient that is less than about 60%. The mode-locked fiber oscillator outputs a plurality of optical pulses. A fiber amplifier is optically connected to the oscillator through an optical connection to the at least one partially transmissive reflective optical elements. The pump source is optically connected to the mode-locked fiber oscillator and the fiber amplifier to pump the mode-locked fiber oscillator and the fiber amplifier.

Another embodiment of the present invention comprises a frequency comb source comprising a mode-locked fiber oscillator, a non-linear optical element, an interferometer, and an optical detector. The mode-locked fiber oscillator comprises a resonant Fabry-Perot optical cavity having a cavity length, L. The mode-locked fiber oscillator outputs optical pulses and corresponding frequency components separated by a frequency spacing, $f_{rep}$ and offset from a reference frequency by a frequency offset, $f_{ceo}$. The non-linear optical element is positioned to receive the optical pulses. The non-linear optical element has sufficient optical non-linearity to generate additional frequency components that together with the plurality of frequency components output by the mode-locked oscillator form a first set of frequencies separated by the frequency spacing, $f_{rep}$ and offset from the reference frequency by the frequency offset, $f_{ceo}$. The interferometer is optically coupled to receive the first set of frequencies. The interferometer comprises a frequency shifter that receives the first set of frequencies and that superimposes a second set of frequencies on the first set of frequencies received by the frequency shifter. The second set of frequencies interfere with the first set of frequencies to produce beat frequencies. The optical detector optically receives the beat frequencies and has an output for outputting the beat frequencies.

Another embodiment of the present invention comprises a method of producing a frequency comb. In this method, longitudinal modes of a fiber laser cavity are substantially mode-locked to produce laser pulses. The laser pulses are propagate through a non-linear optical element to produce a first plurality of frequency components offset from a reference frequency by frequency offset, $f_{ceo}$. The laser pulses are propagated along an optical path that leads to an optical detector. A second plurality of frequency components are generated from the first plurality of frequency components and the first and second plurality of frequency components are propagated on the optical path leading to the optical detector. The first plurality of optical components are interfered with the second set of optical components along the optical path to the optical detector to produce at least one beat frequency. The at least one beat frequency is used to stabilize the offset frequency, $f_{ceo}$.

Another embodiment of the present invention comprises a frequency comb source comprising a mode-locked fiber oscillator, a substantially non-linear optical element, an interferometer, and an optical detector. The mode-locked fiber oscillator comprises an optical fiber and a pair of reflective optical elements that form an optical cavity that supports a plurality of optical modes. The mode-locked fiber oscillator mode-locks the optical modes to produce optical pulses and frequency components having a frequency spacing, $f_{rep}$, and offset from a reference frequency by a frequency offset, $f_{ceo}$. The substantially non-linear optical element is disposed to receive the optical pulses. The substantially non-linear optical element has sufficient optical non-linearity to generate additional frequency components that together with the frequency components output from the mode-locked fiber oscillator form a first plurality of frequency components spaced by the frequency spacing, $f_{rep}$, and offset from the reference frequency by the frequency offset, $f_{ceo}$. The interferometer interferes a second plurality of optical frequency components with the first plurality of frequency components thereby producing beat frequencies. An optical detector is optically connected to the interferometer to detect the beat frequencies. The optical detector has an output that outputs the beat frequencies.

Another embodiment of the present invention comprises a frequency comb source comprising a mode-locked fiber oscillator and a substantially non-linear optical element. The mode-locked fiber oscillator has a resonant cavity comprising an optical fiber having a length, L. The resonant cavity supports a plurality of optical modes. The mode-locked fiber oscillator mode-locks the plurality of optical modes to produce a mode-locked optical signal comprising frequency components separated by a frequency spacing, $f_{rep}$ and offset from a reference frequency by a frequency offset, $f_{ceo}$. The substantially non-linear optical element is positioned to receive the mode-locked optical signal. The substantially non-linear optical element has sufficient optical non-linearity to generate additional frequency components that together with the plurality of frequency components output by the mode-locked oscillator form a first set of frequencies separated by the frequency spacing, $f_{rep}$ and offset from the reference frequency by the frequency offset, $f_{ceo}$.

Another embodiment of the present invention comprises a method of reducing frequency noise of a frequency comb produced by a fiber-based frequency comb source comprising a mode-locked fiber oscillator having an optical cavity comprising an optical fiber having a length, L. The method comprises reducing the dispersion in the mode-locked fiber oscillator to less than about 10,000 femtosec$^2$/m×L.

DETAILED DESCRIPTION OF CERTAIN EMBODIMENTS

Figure 1A:
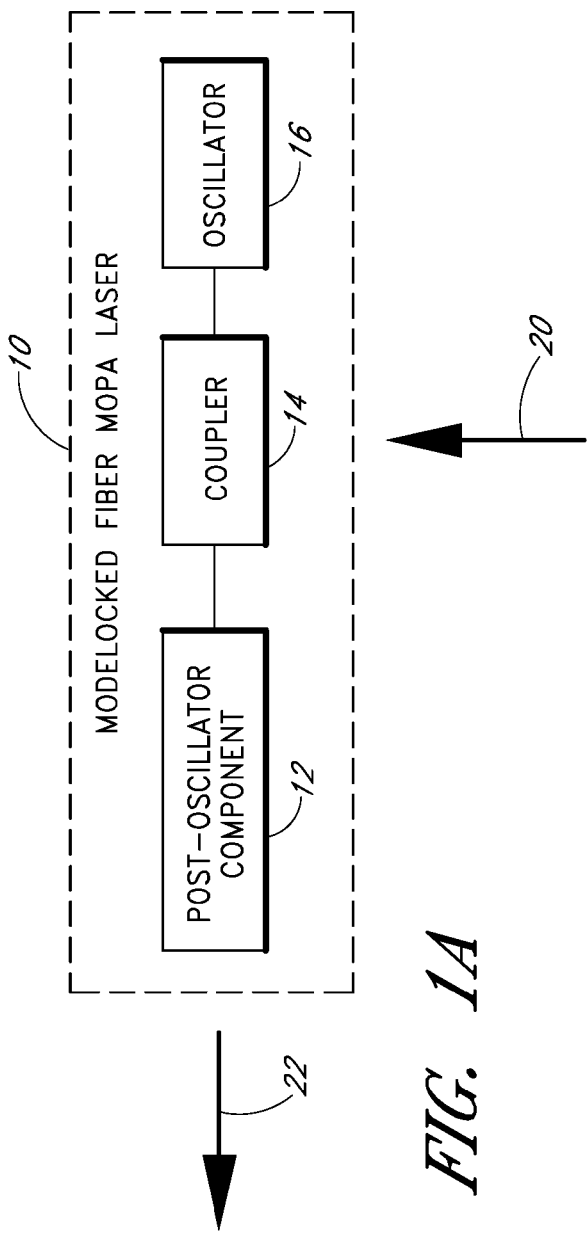
FIG. 1A illustrates a schematic diagram of a fiber master oscillator power amplifier (MOPA)

These and other aspects, advantages, and novel features of the present teachings will become apparent upon reading the following detailed description and upon reference to the accompanying drawings. In the drawings, similar elements have similar reference numerals.

Various embodiments disclosed in the present teachings relate to design and construction of modelocked fiber-based master oscillator power amplifier (MOPA) laser systems. FIG. 1A illustrates a diagram of a fiber MOPA laser 10 comprising a fiber oscillator 16 optically coupled to a post-oscillator component 12 by a coupler 14. In various embodiments, the post-oscillator component 12 comprises a fiber amplifier. In other embodiments, the amplifier may be omitted, and the post-oscillator component 12 may comprise one or more optical elements that condition and deliver the output from the oscillator 16.

One aspect of the present teachings relates to a fiber Bragg grating acting as the coupler 14 between the oscillator and the post-oscillator component 12 such as the amplifier. A bidirectional reflective optical element, such as a fiber Bragg grating, may counter emissions from the post-oscillator component 12 to the oscillator 16, which may otherwise negatively impact the performance of the oscillator. Use of the fiber grating for such a purpose may eliminate the need for a bulk component isolator between the oscillator and the amplifier.

As shown in FIG. 1A, the fiber MOPA laser 10 yields an output signal 22 in response to a pumping energy 20. In various embodiments, the output 22 comprises ultrafast pulses having pulse widths in the femtosecond regime.

Figure 1B:
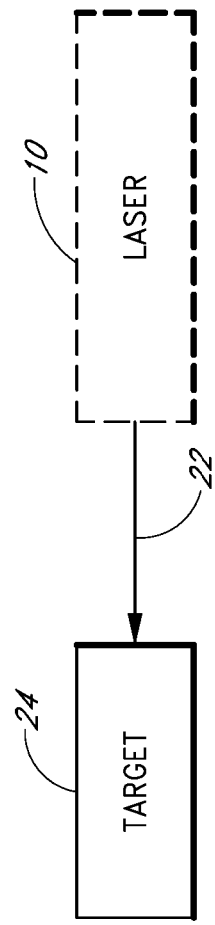
FIG. 1B illustrates a schematic diagram of a target application that uses the output of the fiber MOPA laser of FIG. 1A.

The present teachings also disclose some possible applications of the ultrafast pulses that can be obtained from the laser system 10. FIG. 1B illustrates a diagram where the output 22 from the laser 10 is delivered to a target 24 of interest. As described more fully below, one possible target comprises an interferometer that can be useful for metrology applications.

Various design considerations for the laser system and the target applications are described herein. Such design considerations include, but are not limited to, (1) well defined output polarization state; (2) construction of the fiber laser preferably adaptable to mass production; (3) use of optical elements that are preferably inexpensive; 4) techniques and designs for generation of passive modelocked signals with well controllable parameters; as well as (5) simplified pulse amplification implementation.

Figure 1C:
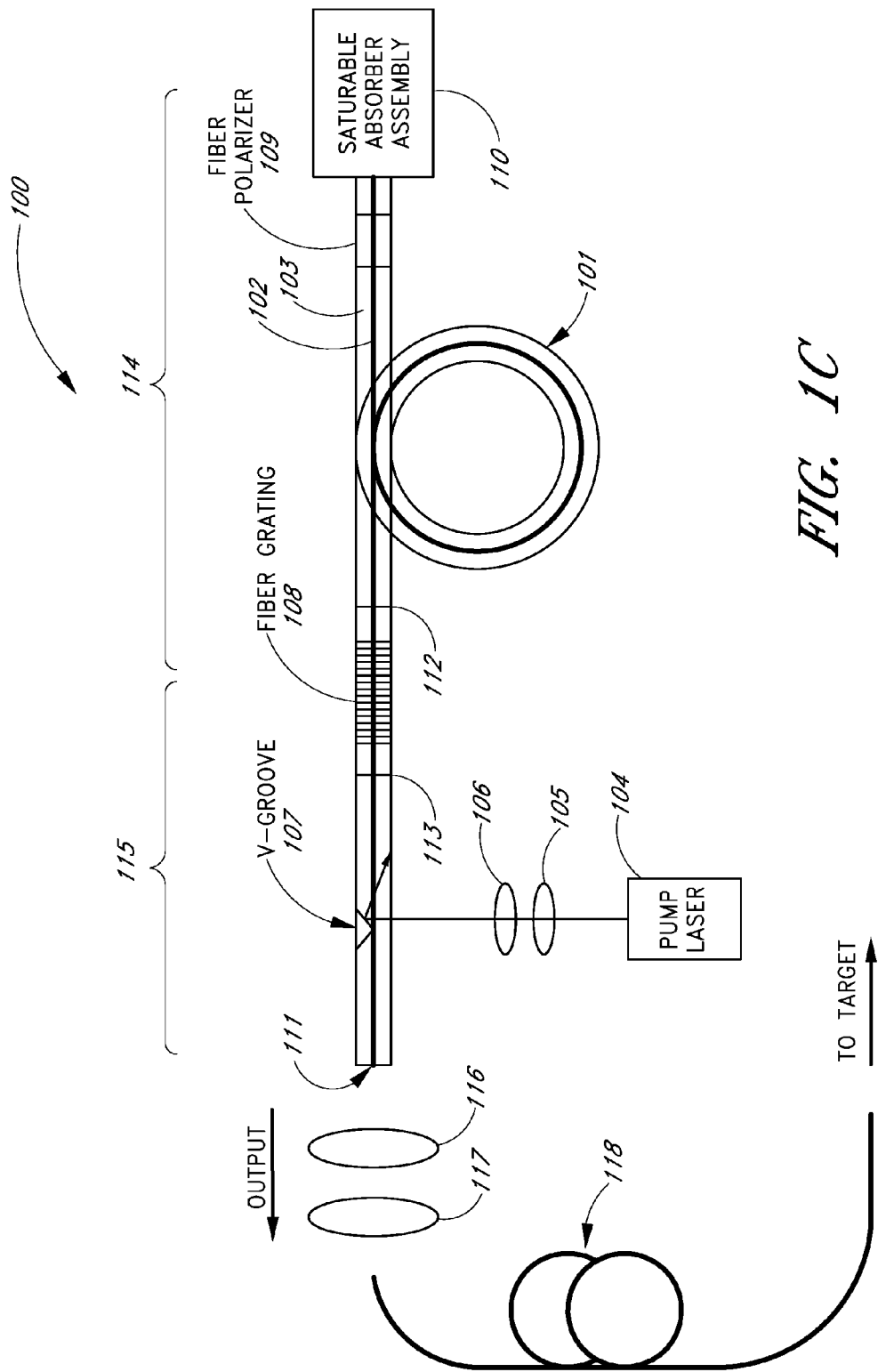
FIG. 1C illustrates an exemplary cladding pumped fiber MOPA design including one embodiment of a fiber delivery assembly.

FIG. 1C represents an exemplary embodiment of a fiber-based master oscillator power amplifier (MOPA) laser system 100. The laser system 100 comprises a polarization-maintaining gain fiber 101 having a core 102 and a cladding region 103. The fiber core 102 can be doped with rare-earth ions such as Yb, Nd, Er, Er/Yb, Tm or Pr, to produce gain at a signal wavelength when the laser system 100 is pumped with an input such as a diode laser 104. The pump diode 104 can be coupled into the cladding region 103 of fiber 101 using for example two lenses 105 and 106 and a V-groove 107. The pump to fiber coupling may be achieved using more than two lenses, or by using any other coupling methods. The fiber core 102 can be single-mode or multi-mode.

As seen in FIG. 1C, the MOPA 100 comprises an oscillator assembly 114 and an amplifier assembly 115. The oscillator assembly 114 is bounded on one end by a fiber grating 108 and on the other end by a saturable absorber assembly 110. The amplifier assembly 115 approaches the fiber grating 108 on one end and is bounded by a fiber end 111 on the other end. In the exemplary fiber-based MOPA laser 100, the same fiber 101 is used in both oscillator and amplifier sections 114, 115. In general, however, different fibers can be used in the oscillator 114 and amplifier 115, though to avoid feedback from the amplifier into the oscillator, the refractive index of both oscillator and amplifier fiber are preferably closely matched in various preferred embodiments.

In the exemplary laser 100, the fiber Bragg grating 108 is formed in a polarization maintaining fiber. The fiber Bragg grating 108 can be written directly into the fiber 101. In alternative embodiments, the fiber Bragg grating 108 can be spliced into the MOPA system 100 at splice positions 112 and 113 between the oscillator and amplifier sections 114, 115, preferably such that the polarization axes of the involved fibers are aligned with respect to each other. Polarization cross-talk between two polarization axes of the polarization maintaining fiber containing the fiber grating 108 is preferably suppressed by more than approximately 15 dB. The fiber grating 108 can be chirped or un-chirped.

The saturable absorber assembly 110 referred to above is described more fully below. As shown in FIG. 1C, the exemplary laser 100 further comprises an optional polarizer 109. The use of an integrated fiber polarizer is optional, since for example, for oscillators operating far above threshold, single-polarization operation of the system can be obtained by the use of a polarization maintaining fiber grating (i.e., a fiber grating written into polarization maintaining fiber).

Figure 2:
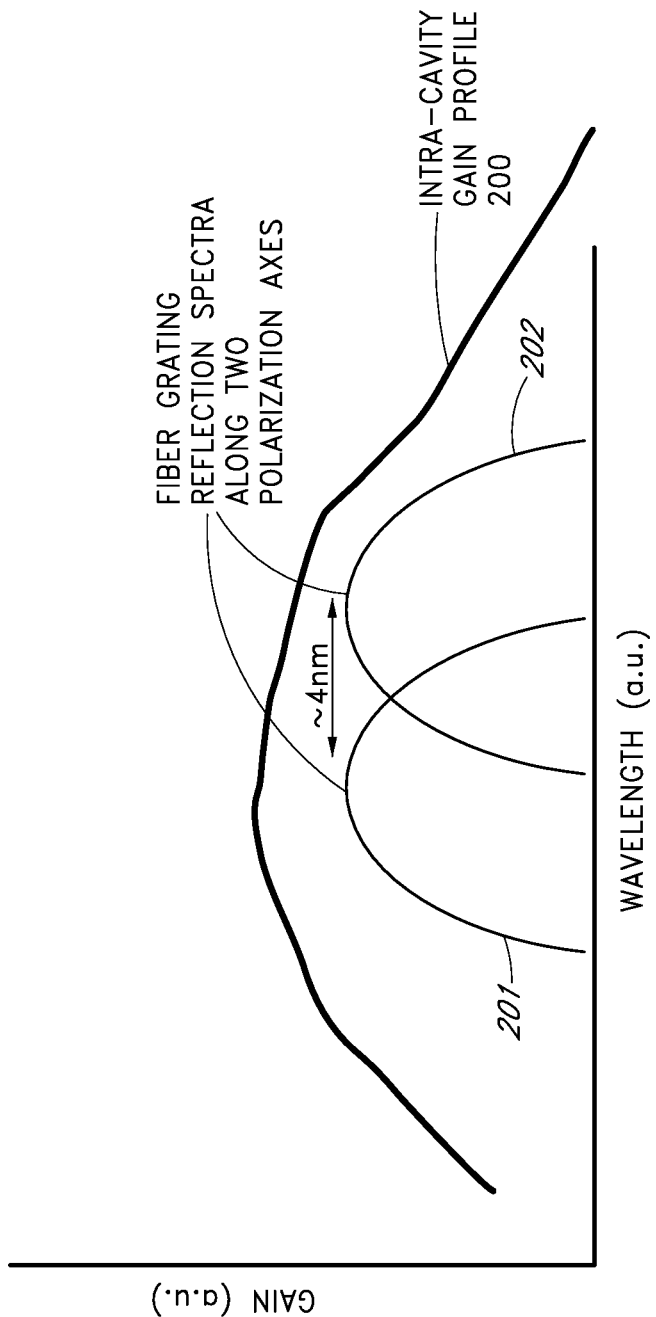
FIG. 2 illustrates an exemplary fiber grating reflection spectra along two polarization axes that allow polarization selection in modelocked fiber lasers having polarization maintaining fiber Bragg gratings.

This polarization maintaining concept is illustrated in FIG. 2, where an intra-cavity fiber gain as a function of wavelength inside the fiber oscillator is represented with line 200. The reflectivity along the two polarization axes of the polarization maintaining (PM) fiber grating is represented with curves 201 and 202. Due to the birefringence of the PM fiber grating, the peak reflection wavelengths along the two polarization axes differ by approximately between 1-10 nm, depending on the birefringence of the fiber. The absolute cavity gain along the two polarization axes is proportional to the product of the fiber grating reflectivity and the fiber gain integrated over wavelength. Hence even very small wavelength dependent slopes in the fiber gain produce a difference in absolute cavity gain for the two polarization axes, and lasing will start out in the higher gain axis and suppress lasing in the lower gain axis once the gain inside the cavity is saturated.

An exemplary integrated fiber polarizer is described in a U.S. patent application Ser. No. 10/627,069 filed on Jul. 25, 2003, now U.S. Pat. No. 7,088,756, which is hereby incorporated herein by reference in its entirety.

One aspect of the present teachings relates to a fiber grating (108 in FIG. 1C) being interposed between the oscillator and amplifier components of a fiber-based MOPA laser. Such a fiber grating may perform three uses. First, the fiber grating may be used as an output mirror (i.e., it feeds part of the signal back to the fiber oscillator cavity 114). Second, the fiber grating can control the amount of cavity dispersion as explained in the U.S. patent application Ser. No. 10/627,069. Third, the fiber grating can prevent emission from the amplifier assembly 115 from perturbing output of the oscillator assembly 114, thereby foregoing the need for an optical isolator separating the amplifier and oscillator.

Saturation of the gain inside a modelocked fiber oscillator 114 can be obtained when the laser is operated far above its threshold. Because of the small core size of optical fibers, self-phase modulation generally limits the obtainable output power of modelocked fiber lasers; and modelocked operation far above lasing threshold is not easily accomplished. In one aspect of the present teachings, the reflectivity of the PM fiber grating is reduced thereby increasing population inversion and allowing increased output power. Modelocked laser operation significantly above the threshold can be achieved. In one embodiment, the PM fiber grating reflectivity is less than or equal to approximately 60%. In various embodiments, for example, the reflectivity of the reflective optical element forming the laser cavity may be less than or equal to about 50%, 40%, or 30%. Smaller reflectivities are possible. The reflectivity, may for example be less than or equal to about 20%, 10%, 5%, or 3% in certain embodiments. Still, other ranges of reflectivity values not specifically referred to herein are also possible. This relatively low reflectivity criteria is nearly the opposite to the design of single-polarization continuous-wave (CW) single-frequency lasers, where the reflectivity of the PM fiber grating is maximized to values greater than approximately 90% to enable reliable single-polarization operation. In contrast, the reflectivity of the reflective optical element forming the laser cavity for embodiments of mode-locked oscillators described herein are preferably less than 90%.

With reduced reflectivity, pump power will be increased. Generally, reliable modelocked operation in one polarization axis can be obtained when the pump power supplied to the laser oscillator at modelocking threshold exceeds the pump power for the CW laser threshold by around 10-20%.

As discussed above, the fiber grating may counter emission from the amplifier assembly (115) to the oscillator assembly (114) that would otherwise be detrimental to the performance of the oscillator. The reflectivity of the grating 108 can be very small and still replace an efficient isolator. Such a design criteria is in contrast to conventional single-frequency lasers. In various MOPA embodiments disclosed herein, a product of the reflectivities for the oscillator cavity (one of which is the grating 108) can be as low as about 10% or 5% or less, such as, for example, about 3%. Since the ratio of a photon's cavity lifetime $\tau_c$ to its single-pass transit time $\tau_t$ can be expressed as $$\tau_c/\tau_t = 2/[-\ln(R_1 R_2)], \quad (1)$$

where $R_1 R_2$ is the product of reflectivities, $R_1 R_2 = 0.03$ results in the ratio $\tau_c/\tau_t \approx 0.6$ (e.g. with $R_1 \approx 100\%$ and $R_2 \approx 3\%$). Hence, the cavity lifetime in ultrafast MOPAs can be shorter than the single-pass transit time. Such a feature is unique when compared to other MOPA designs in the field of semiconductor lasers or CW fiber lasers.

As discussed above, low grating reflectivities enable operation of the oscillator further above threshold. Such operation above threshold increases the oscillator output power, reducing amplified spontaneous emission (ASE) noise, and increasing the polarization selectivity of PM fiber gratings.

The fiber grating can also be used to control the dispersion of the pulses in the fiber. As explained in the U.S. patent application Ser. No. 10/627,069, to produce the short pulses (with an optical bandwidth comparable to or larger than the bandwidth of the gain medium), the absolute value of the grating dispersion is preferably selected to be within a range of approximately 0.5-10 times the absolute value of the intra-cavity fiber dispersion, where the grating dispersion and the fiber dispersion are selected to be of opposite signs. Accordingly, the oscillation of chirped pulses is enabled in the cavity, thereby reducing or minimizing the effects of the nonlinearity of the cavity and further maximizing the pulse energy.

As further shown in FIG. 1C, the output of the MOPA can be coupled to a delivery fiber 118 via exemplary coupling lenses 116, 117. The chirp of the output pulses can be conveniently compensated with the delivery fiber 118. The delivery fiber 118 can comprise by way of examples, a standard silica step-index fiber or a holey fiber such as a photonic crystal fiber. The use of a photonic crystal fiber for dispersion compensation and pulse delivery is disclosed in U.S. patent application Ser. No. 10/608,233 filed on Jun. 30, 2003, now U.S. Pat. No. 7,257,302, which is hereby incorporated herein by reference in its entirety. The delivery fiber 118 can also be spliced directly to the fiber end face 111 of the amplifier assembly 115, thereby enabling a further integration of the laser assembly. Compressed pulses can thus be output from the delivery fiber.

Figure 3A:
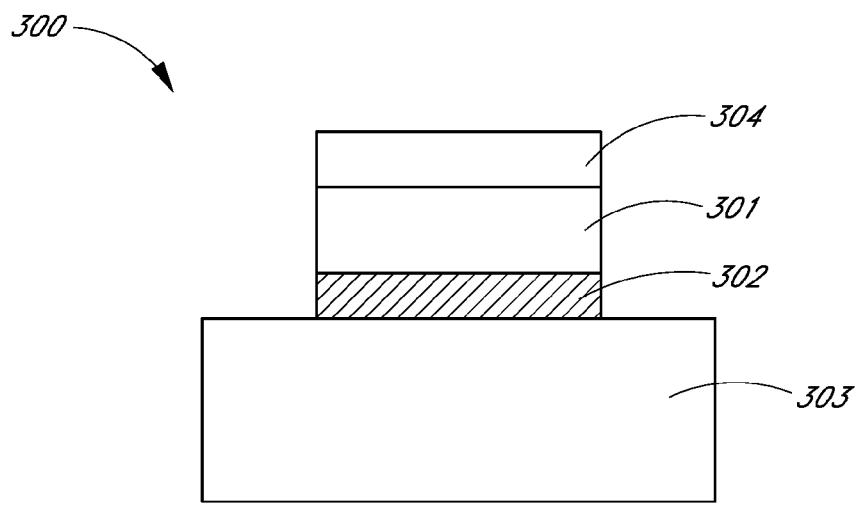
FIG. 3A illustrates a schematic diagram of one embodiment of a saturable absorber mirror.

FIGS. 3A and B now illustrate two possible embodiments of the saturable absorber assembly 110 referred to above in reference to FIG. 1C. In one embodiment as shown in FIG. 3A, a saturable absorber module (SAM) 300 includes an InGaAsP layer 301 with a thickness of approximately 50-2000 nm. The layer 301 can be grown with a bandedge in the 1 μm wavelength region; the wavelength is defined by the sought emission wavelength of the fiber laser and can vary between approximately 1.0-1.6 μm. The InGaAsP layer 301 can be further coated or processed with a reflective material such as Au or Ag. Preferably, a dielectric mirror or a semiconductor Bragg reflector 302 is located adjacent the layer 301, and the entire structure is mounted to a heat sink 303 based on, for example, metal, diamond or sapphire.

The InGaAsP layer 301 can further be anti-reflection coated with a layer 304 on its surface opposite from the reflecting surface 302 to optimize the performance of the SAM 300. Because of the saturable absorption by the InGaAsP layer 301, the reflectivity of the SAM 300 increases as a function of light intensity, which in turn favors the growth of short pulses inside the laser cavity. The absence of Al in the saturable absorber layer 301 prevents oxidization of the semiconductor surfaces in ambient air, and thus enhances the lifetime and power handling capability of the structure.

Instead of InGaAsP, any other saturable semiconductor material can be used in the construction of the SAM. Also, Al-containing semiconductors can be used in the SAM with appropriately passivated surface areas. Surface passivation can, for example, be accomplished by sulfidization of the semiconductor surface, encapsulating it with an appropriate dielectric or with an Al-free semiconductor cap layer. An AlGaInAs absorber layer grown lattice-matched on InP can be surface-passivated with a thin (about 10 nm range) cap layer of InP. AlGaInAs with a higher bandgap energy than the absorber layer can also be used for a semiconductor Bragg reflector in combination with InP. Among concepts for semiconductor Bragg mirrors lattice-matched to InP, an AlGaInAs/InP combination has an advantage over an InGaAsP/InP Bragg reflector due to its high refractive index contrast.

Figure 3B:
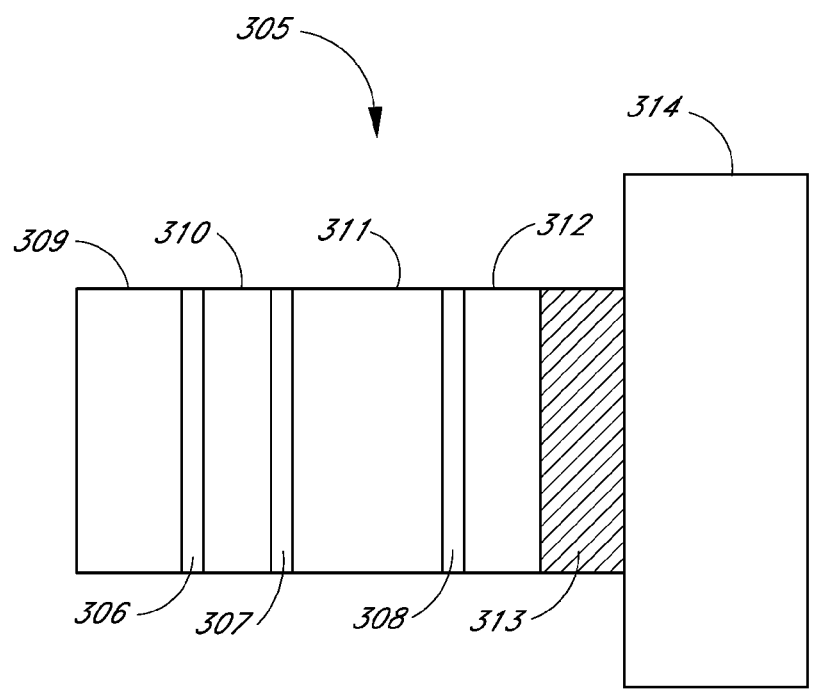
FIG. 3B illustrates another embodiment of a saturable absorber mirror.

Instead of a bulk semiconductor saturable absorber, a multi-quantum well (MQW) saturable absorber structure 305 as shown in FIG. 3B may also be used. The SAM 305 conveniently comprises MQW structures 306, 307 and 308 interleaved with passive spacer layers 309, 310, 311, and 312 in order to increase the saturation fluence and depth-selective ion-implantation concentration of each MQW section. Additional MQW structures can be used, similarly separated by additional passive spacer layers. To reduce the wavelength and location sensitivity of the MQW saturable absorbers, the width of the spacer layers can vary from spacer layer to spacer layer. Furthermore, multiple bulk layers with thicknesses larger than approximately 500 Å can replace the MQW structure. The MQW layers, in turn, can comprise several layers of quantum wells and barriers such as, for example, InGaAs and GaAs, or InGaAsP/InP and AlGaInAs/InP, respectively.

The exposed surface of the layer 309 can further be anti-reflection coated (not shown). The reflective function of the structure 305 can be obtained by including a mirror structure 313. The entire structure can be mounted on a heat sink 314.

The control of the response time of the saturable absorption for concomitant existence of fast and slow time constants can be realized by introducing carrier trap centers with depth controlled H+(or other ion) implantation. The implantation energy and dose can be adjusted such that part of the absorbing semiconductor film contains a minimal number of trap centers. For example, the semiconductor layer with the minimal number of trap centers can be selected to be at the edge of the optical penetration range of exciting laser radiation. Such a design serves only as an example, and alternatively any semiconductor area within the optical penetration range can be selected to contain a minimal number of trap centers. Hence, distinctive bi- or multi-temporal carrier relaxation can be obtained in the presence of optical excitation.

Additional details about the structures and properties of the saturable absorber assemblies are described in the U.S. patent application Ser. No. 10/627,069 which is incorporated herein by reference in its entirety. Other saturable absorber designs, however, not specifically recited herein, such as those known in prior art or yet to be devised, are also possible.

Some possible design examples of the fiber MOPA laser are now described. In one exemplary design (Design Example #1) corresponding to the fiber MOPA laser system of FIG. 1C, the polarization-maintaining fiber 101 is doped with Yb with a doping level of approximately 1% by weight. The diameter of the fiber core 102 is approximately 6 μm, and the cladding (103) diameter is approximately 125 μm. The intra-cavity length of the doped fiber is approximately 1.0 m. An additional approximately 1.0 m length of undoped polarization-maintaining fiber is incorporated intra-cavity in place of the fiber polarizer 109. The overall (summed) dispersion of the two intra-cavity fibers is approximately +0.09 ps$^2$.

In contrast, the single-mode polarization maintaining fiber grating 108 has a dispersion of approximately −0.11 ps$^2$ to approximately match the fiber dispersion, a spectral bandwidth of approximately 25 nm, and a reflectivity of approximately 10% centered at approximately 1050 nm. The grating 108 was manufactured with a phase mask with a chirp rate of approximately 350 nm/cm. The fiber grating 108 is spliced into the MOPA using the splices 112 and 113. The length of fiber from the position of the grating 108 to the splices is less than approximately 5 cm.

The total oscillator dispersion is approximately −0.02 ps$^2$ (fiber dispersion+grating dispersion). The extra-cavity length of doped fiber 101 is approximately 30 cm. The MOPA is pumped through the V-groove 107 with a pump power up to approximately 1 W at a wavelength of approximately 976 nm.

The saturable absorber element 110 comprises a film of InGaAsP grown on an InP substrate. The bandedge of the InGaAsP film is at approximately 1050 nm. The InGaAsP film thickness is approximately 500 nm, and the short lifetime of the absorber is approximately 1 ps and the second long absorber lifetime is around 150 ps.

The laser produces chirped optical pulses with a full-width half maximum width of approximately 1.5 ps at a repetition rate of approximately 50 MHz with an average power of approximately 60 mW. The pulse spectral bandwidth is around 25 nm and thus the pulses are around 10 times longer than the bandwidth limit, which corresponds to around 100 fs. The generation of pulses with a pulse width of approximately 140 fs is enabled by the insertion of the pulse compressor/delivery fiber 118 at the output of the MOPA. Details on such pulse compressing fibers are disclosed in the U.S. patent application Ser. No. 10/608,233.

The output of the MOPA is coupled into the compressor/delivery fiber 118 using the lenses 116 and 117. In this design example, a fiber with a central air-hole is used to reduce self-phase modulation in the compressor fiber 118. Alternative pulse compressor elements, such as fiber gratings, bulk gratings, bulk volume gratings, chirped mirrors or prism pairs can be used instead of the compressor fiber 118 to provide pulse compression. Still other designs are possible. Furthermore, although in this design example a side-pumped MOPA system is disclosed, other pumping methods such as end-pumping and/or pumping through fiber couplers can be used.

Figure 4:
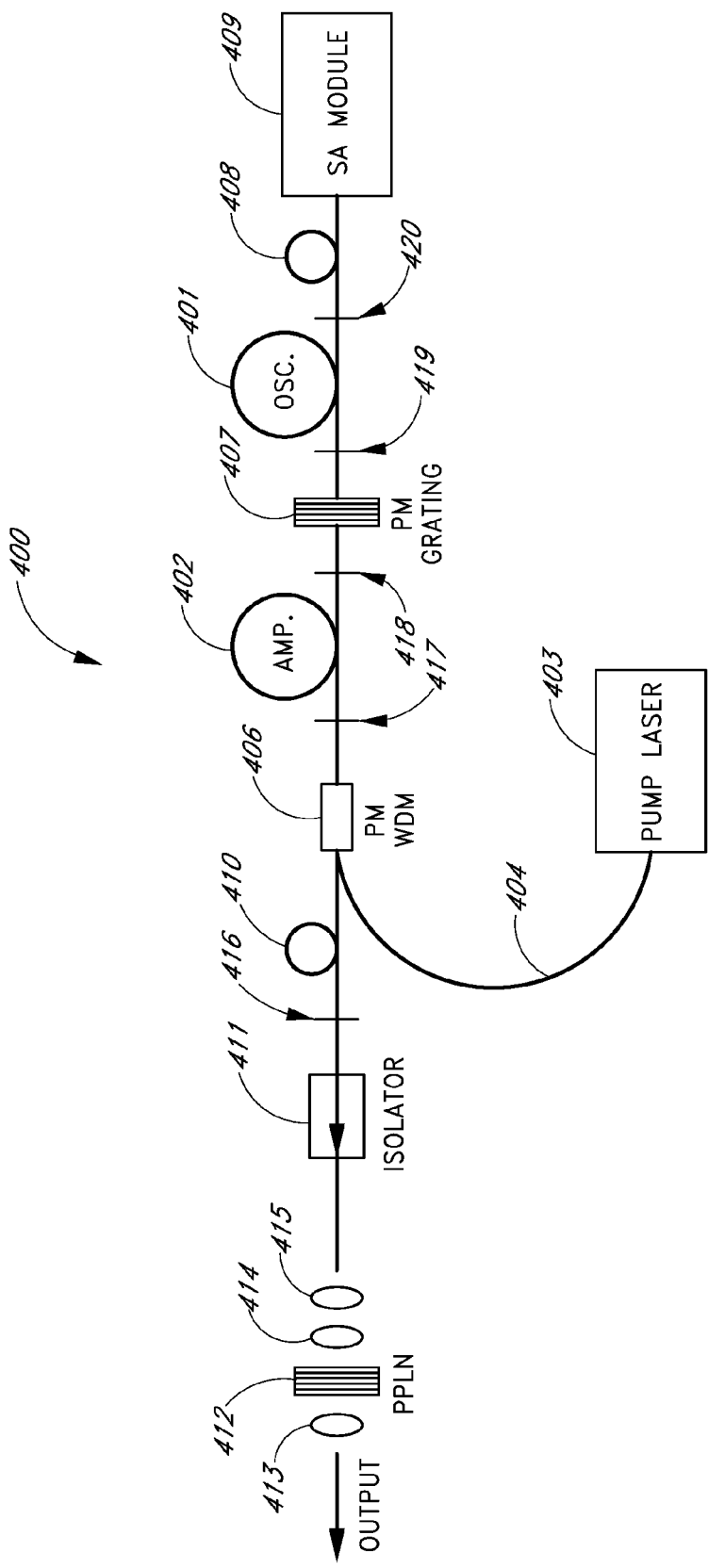
FIG. 4 illustrates an exemplary core pumped fiber MOPA according to one embodiment of the present teachings.

FIG. 4 illustrates another embodiment of a particularly stable single-mode pumped fiber MOPA laser 400. The MOPA 400 comprises substantially identical composition Er oscillator and amplifier fibers 401 and 402. The MOPA is pumped via a pump laser 403 through a pigtail 404 and a polarization-maintaining wavelength division multiplexing (WDM) coupler 406.

An alternative method for the isolation of the signal light from the pump port is to use a thin film-based WDM filter as the coupler 406. Such a filter has dielectric coatings on both sides where the coating on one side forms a low or high band pass filter. In one embodiment of such a device, the filter provides high reflectivity for the signal wavelength, while high transmission is provided for the lower pump wavelength. However, any leakage of the signal light into the pump port is generally not suppressed by more than approximately −25 dB in such a basic thin-film WDM. A preferred embodiment of a thin film WDM coupler comprises a multiple stack of thin film WDM filters for the coupler 406 for higher signal isolation. For example, with the addition of two additional filters to the WDM, the signal isolation into the pump port can be increased by approximately −70 dB. Thin film WDMs are known in the art, and the stacking of several thin film filters in such a WDM is a straight-forward extension of the design of such standard WDMs, and therefore is not separately shown. Standard WDM couplers based on evanescent coupling can also be utilized.

The pump light is passed through the amplifier fiber 402 and through a polarization-maintaining (PM) grating 407 to the oscillator fiber 401. The oscillator assembly also comprises an undoped fiber section 408 interposed between the oscillator fiber 401 and a saturable absorber module 409.

The output from the MOPA is directed via the WDM 406, through a polarization-maintaining (PM) pig-tail 410 and a PM isolator 411, towards an output end of the system. An optional frequency conversion element 412 comprising for example a periodically poled LiNbO$_3$ (PPLN) can be inserted at the output end of the system, where lenses 413, 414, and 415 are used to obtain an appropriate beam diameter inside the PPLN crystal 412. All fiber elements of the MOPA laser 400 are connected with PM splices denoted as 416, 417, 418, 419, and 420.

Although Er-doped fibers are used in the MOPA laser 400 of FIG. 4, similar single-mode pumped systems can be constructed using other rare-earth gain media such as Yb, Nd, Tm, Pr, Ho and combinations thereof. Similarly, whereas a diode pump laser (403) is used for pumping, other solid-state or fiber based pump lasers may also be used. Still other configurations are possible.

In one exemplary design (Design Example #2) corresponding to the fiber MOPA laser system of FIG. 4, the length of the oscillator and amplifier fibers 401, 402 are approximately 1 meter and 0.40 meter, respectively. The thin-film based WDM filter provides high reflectivity for the signal wavelength around 1550 nm, while high transmission is provided for the pump wavelength around 980 nm. It should be understood, however, that the application of such a pump-signal combiner WDM is not limited to 1550 nm and 980 nm for the signal and pump lines. The PM grating 407 is chirped with a reflectivity of approximately 10% and a dispersion of approximately −0.12 ps$^2$. The undoped fiber section 408 has a length of approximately 1 m. The saturable absorber module 409 comprises a bulk InGaAsP saturable absorber mirror. The InGaAsP film has a bandedge of approximately 1560 nm, and the two saturable absorber lifetimes are optimized with depth selective ion implantation as approximately 1 ps and 130 ps. The foregoing operating parameters result in the MOPA system 400 producing an output power up to approximately 100 mW at a wavelength of approximately 1560 nm, amplifying the oscillator power by more than a factor of three.

Figure 5:
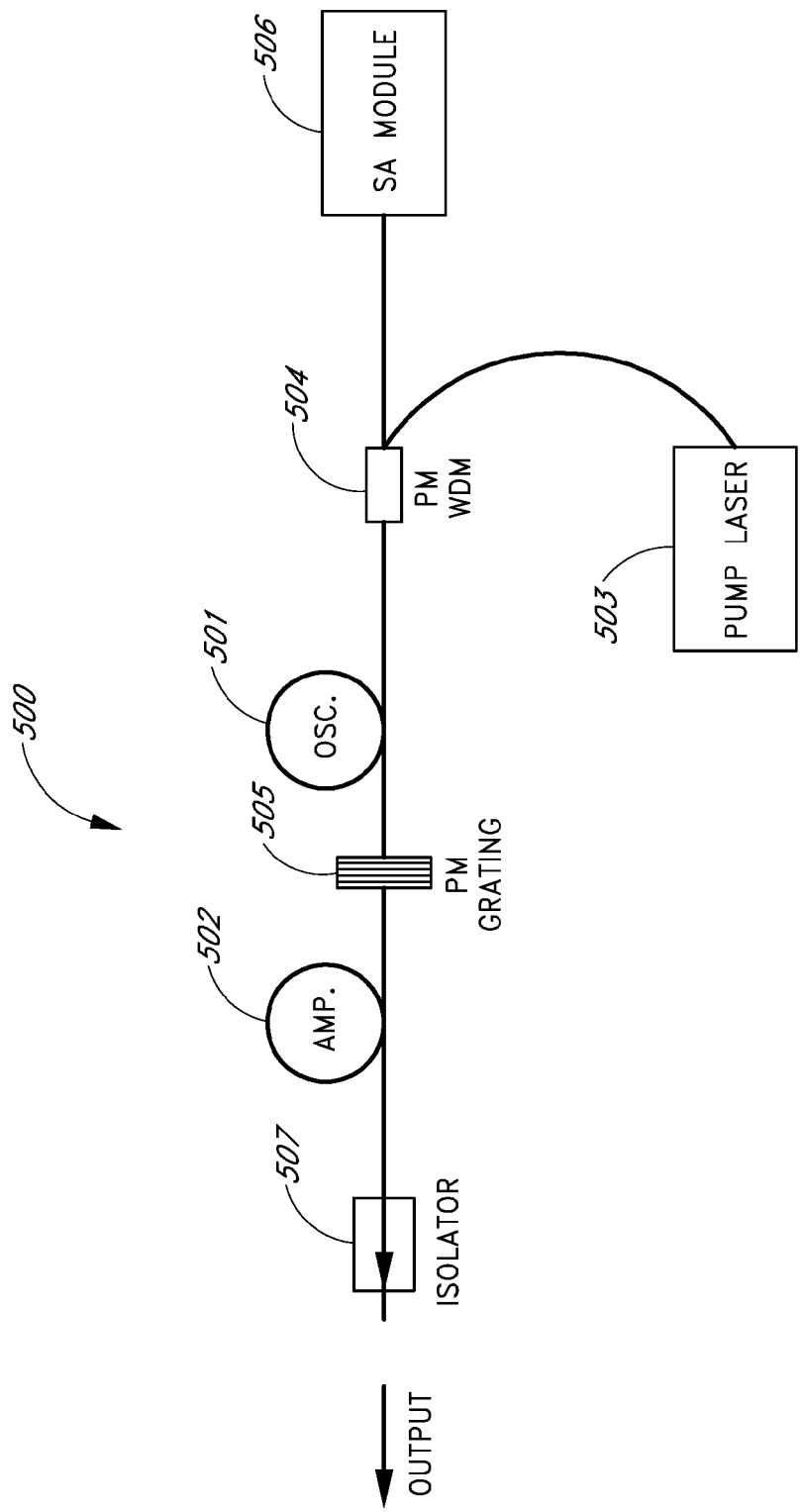
FIG. 5 illustrates another embodiment of a core pumped fiber MOPA.

FIG. 5 illustrates a variation to the MOPA design 400 described above in reference to FIG. 4. The MOPA design 400 shown in FIG. 4 comprises a pump source delivered first to an amplifier and then to an oscillator. Alternatively, as shown in FIG. 5, a MOPA design 500 comprises a pump source 503 delivered first to an oscillator 501 and then to an amplifier 502. The pump laser 503 is delivered to the oscillator through a PM WDM 504. A PM fiber grating 505 is interposed between the oscillator 501 and the amplifier 502. A saturable absorber module 506 is disposed on the end of the oscillator 501 opposite from the fiber grating 505.

The output from the MOPA is extracted through an isolator 507. A design as shown in FIG. 5 may be used to insert an optical isolator between the oscillator 501 and the amplifier 502 without the need for an additional pump source. In such a design, the isolator can be disposed between the amplifier 502 and the fiber grating 505. For example, when using an Er-fiber MOPA system, pumping at a wavelength of approximately 1480 nm is possible, while the emission wavelength of Er is approximately in the 1.55 μm wavelength region. Due to the small difference in wavelength between pump and emission, such an isolator can isolate at both wavelengths without the introduction of large optical losses.

Figure 6:
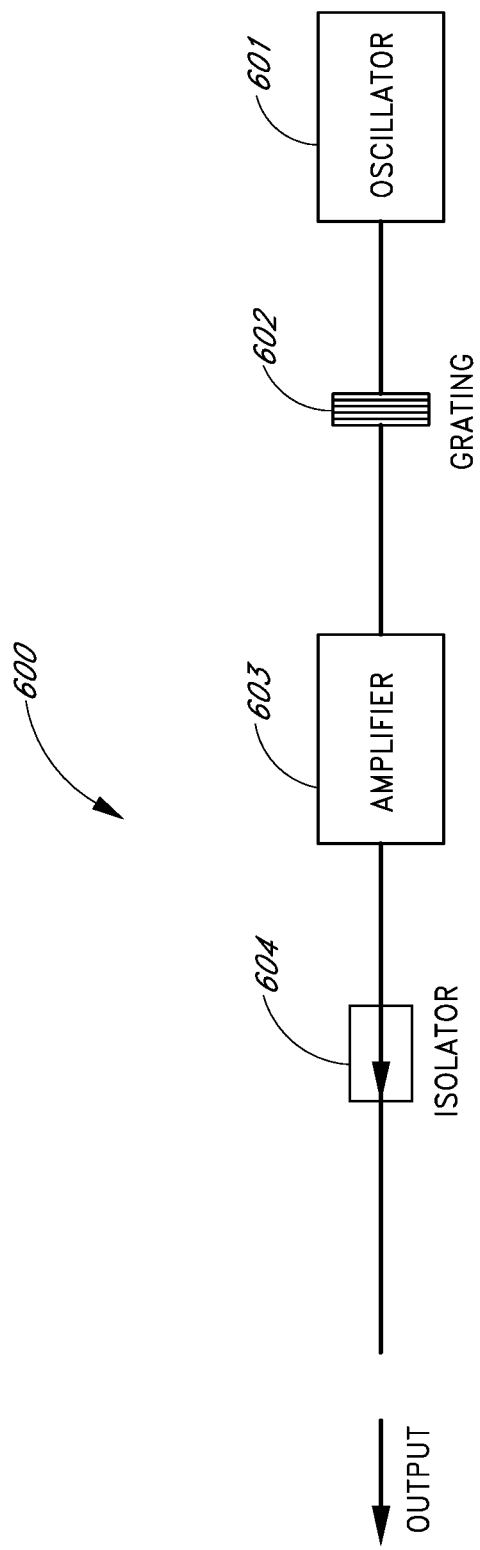
FIG. 6 illustrates a block diagram of a polarization maintaining fiber MOPA design.

It will be appreciated that many alternative embodiments for cladding-pumped or core pumped fiber MOPAs are possible. FIG. 6 now illustrates a generalized MOPA design of the present teachings. A generic MOPA 600 comprises a modelocked fiber oscillator 601 that uses a fiber grating 602 as an output coupler. No isolator is used between the oscillator 601 and an amplifier 603 that is inline with the fiber grating 602 and the oscillator 601.

The fiber amplifier 603 further amplifies the pulses from oscillator 601. An optional isolator 604 suppresses feedback from any spurious reflections outside the system.

Both oscillator and amplifier are preferably constructed from predominantly polarization maintaining fiber. That is, any length of non-polarization maintaining fiber is preferably kept smaller than approximately 10 cm to prevent de-polarization in such non-polarization maintaining fiber sections. A single pump source can be used to pump both oscillator and amplifier, although separate pump sources coupled to the oscillator and the amplifier can also be implemented.

FIGS. 7-12 illustrate various applications of the output signals that can be generated by the various embodiments of the fiber MOPA lasers described above in reference to FIGS. 1-6. It will be understood that such applications are in no way intended to limit the applicability of the laser designs of the present teachings.

Figure 7:
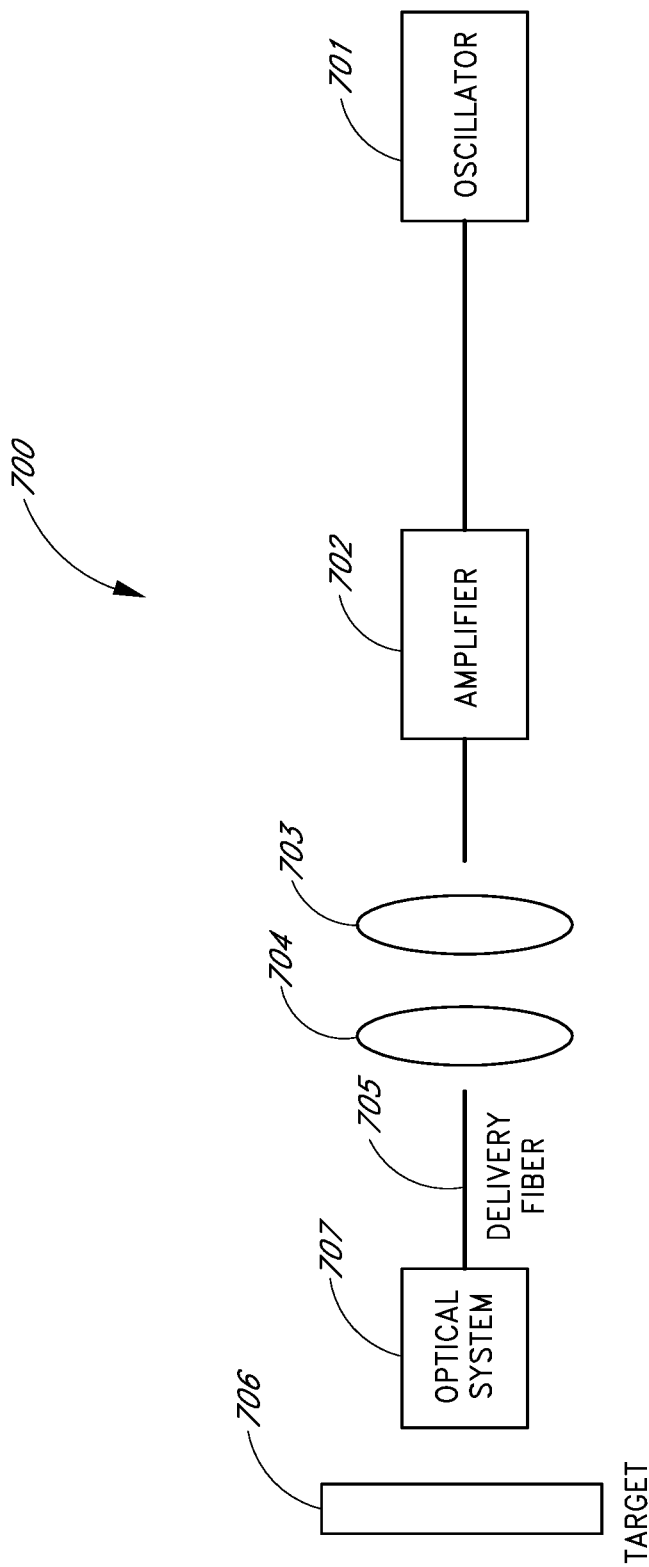
FIG. 7 illustrates a block diagram of a polarization maintaining fiber oscillator-amplifier design including an embodiment of a pulse delivery assembly.

For many applications of ultrafast fiber lasers, a delivery of ultrashort pulses in a single polarization state is desired. FIG. 7 illustrates a generic system 700 that can deliver such pulses. The system 700 comprises a modelocked fiber oscillator 701 and a fiber amplifier 702, where the oscillator 701 produces a well-defined polarization state, which is preferably linear. The amplifier 702 comprises a polarization-maintaining fiber, and preferably produces chirped linearly polarized pulses.

The system 700 further comprises lenses 703 and 704 that couple the output from the fiber amplifier 702 to a delivery fiber 705 that is preferably also polarization maintaining. The dispersion of the delivery fiber 705 can be used to produce optimally short pulses at an optical target 706 downstream from the oscillator amplifier system. An optical system 707 can be used to image the output of the delivery fiber 705 onto the target 706. To enable increased or maximum power handling of the fiber delivery system, the delivery fiber 705 is preferably constructed from a fiber with a guiding air hole such as a hollow core photonic band gap fiber.

MOPA's such as described herein can be used to create an accurate and stable reference source of standard wavelength and frequencies. Such standard wavelengths and frequencies can be employed, for example, in research related activities such as metrology as well as other applications. For such applications in metrology, the generation of coherent optical spectra with a spectral width of one octave and more is of particular interest. The use of a modelocked laser allows the generation of combs of well-defined frequencies. The generated frequency comb is considered to be well-defined if two degrees of freedom, namely the repetition frequency of the laser $f_{rep}$ and the carrier envelope offset frequency $f_{ceo}$, can be measured or preferably stabilized to an external clock. See, for example, Steven T. Cundiff et al, "Optical Frequency Synthesis Based on Mode-locked Lasers", Review of Scientific Instruments, vol. 72, no. 10, October 2001, pp. 3749-3771 as well as Steven T. Cundiff et al, "Femtosecond Optical Frequency Combs," Reviews of Modern Physics, vol. 75, January 2003, pp. 325-342, which are hereby incorporated herein by reference in their entirety. The frequency of one comb line can be expressed as $$f_n = n f_{rep} + f_{ceo} \quad (2)$$

where n is the integer identifying the single comb line. Measurement and stabilization of $f_{ceo}$ is possible, for example, with an octave spanning external broadened modelocked laser source and an f to 2f interferometer. Schemes for the self-referencing stabilization of $f_{ceo}$ are described for example in H. R Telle et al. Appl. Phys. B 69, 327-332 (1999), which is hereby incorporated herein by reference in its entirety.

Frequency combs spanning one octave can be generated by supercontinuum generation in nonlinear fibers. For industrial applications of frequency combs, the generation of supercontinua from modelocked fiber or general waveguide lasers may be particularly advantageous. As described above, various polarization maintaining and highly integrated fiber laser designs of the present teachings allow the generation of coherent continua.

Figure 8A:
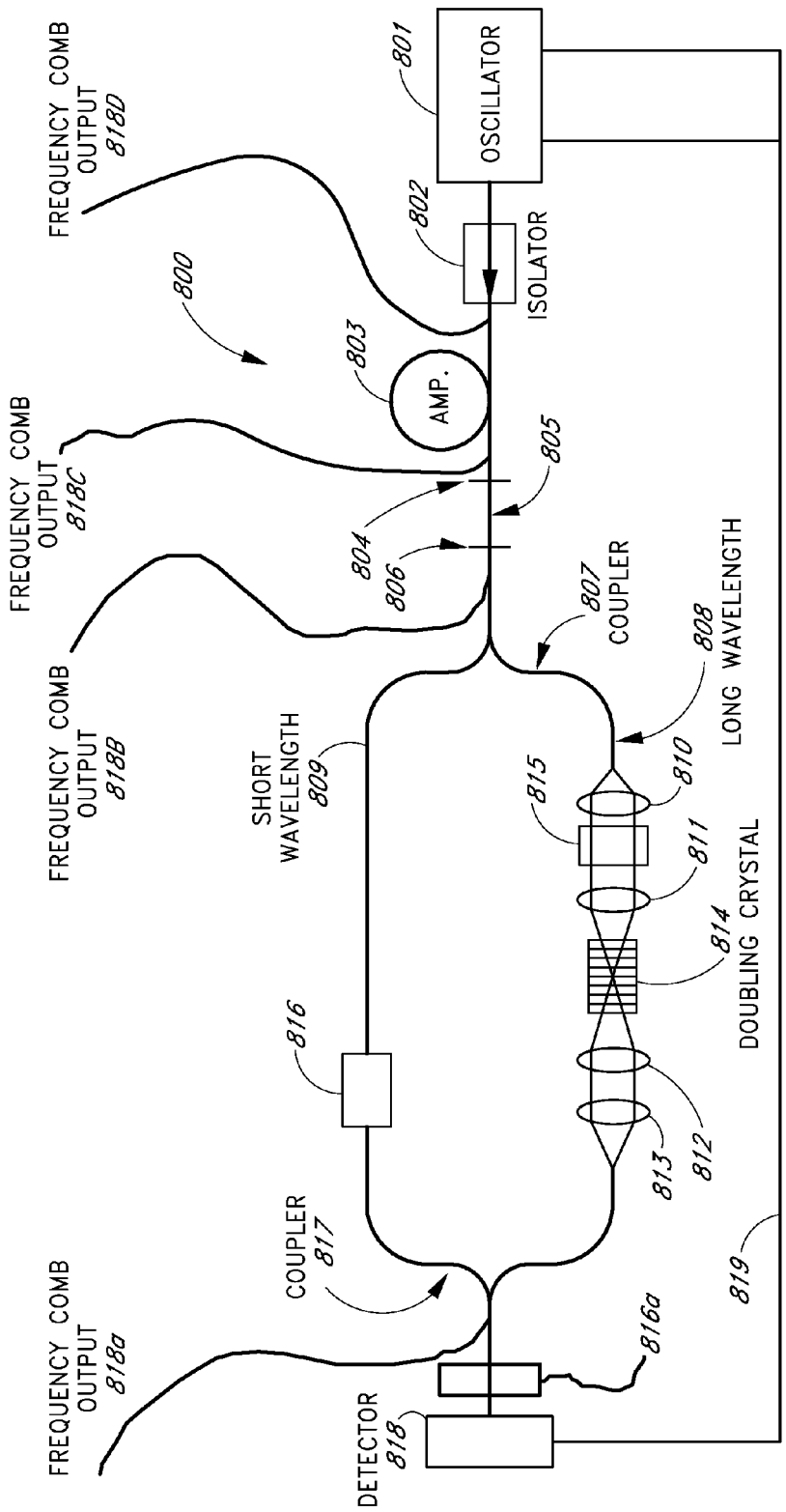
FIG. 8A illustrates an exemplary polarization maintaining fiber oscillator-amplifier coupled to a highly nonlinear fiber in conjunction with one embodiment of an oscillator phase control system.
Figure 8B:
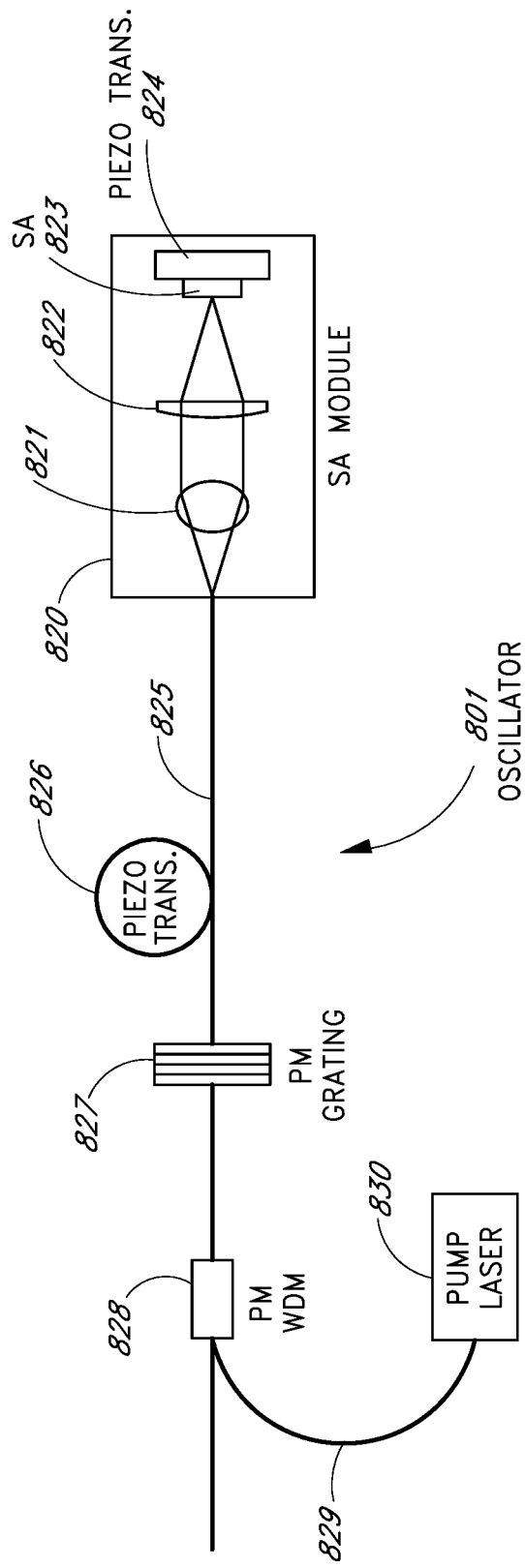
FIG. 8B illustrates one embodiment of the polarization maintaining fiber oscillator of FIG. 8A wherein the oscillator design allows for phase control of the oscillator.

FIGS. 8A and 8B illustrate an exemplary frequency comb source 800 that generates such a polarization maintaining continuum (or frequency comb). As shown in FIG. 8A, the frequency comb source 800 comprises a polarization maintaining fiber oscillator 801 which is described below in greater detail in reference to FIG. 8B. An output from the oscillator 801 is directed via an isolator 802 to a polarization maintaining fiber amplifier 803. With carefully designed systems, such as some of the fiber lasers described above, the isolator 802 may be omitted and similar protection of the oscillator from spontaneous emissions from the amplifier may be achieved by a fiber Bragg grating which may even possess only small reflectivity (R≈3%) in some cases.

For applications in metrology, the oscillator 801 and the amplifier 803 are preferably pumped by two different pump sources, allowing independent control thereof although other configurations are possible. The pump source (not shown) for the fiber amplifier 803 is preferably single-mode or has a very low residual noise. The pump source is injected into the amplifier 803 via a polarization maintaining wavelength division multiplexing coupler (not shown). Alternatively, a cladding-pumped fiber amplifier can also be implemented. Other arrangements can be employed as well.

As shown in FIG. 8A, the fiber amplifier 803 is connected via a splice 804 to a highly nonlinear fiber (HNLF) 805. The highly nonlinear fiber 805 is preferably constructed from a holey fiber or a standard silica fiber or using bismuth-oxide based optical glass fiber in various embodiments. The dispersion of the highly nonlinear fiber 805 is preferably close to approximately zero at the emission wavelength of the oscillator 803 for certain designs. Even more preferably, the dispersion profile is flattened, i.e., the third-order dispersion of the fiber 805 is equally close to approximately zero. The highly nonlinear fiber 805 does not need to be polarization maintaining since it is relatively short (on the order of few cm long), thereby enabling long-term polarization stable operation. The length of the highly nonlinear fiber 805 is preferably selected to be less than approximately 20 cm to preserve the coherence of the generated continuum. Other designs, however, are possible.

The (continuum) output from the highly nonlinear fiber 805 is injected via a splice 806 to a wavelength division multiplexing coupler 807. The coupler 807 directs the long and short wavelength components from the continuum to a long wavelength coupler arm 808 and a short wavelength coupler arm 809 respectively. The long wavelength components are subsequently frequency doubled using exemplary lenses 810, 811, 812, 813, as well as a doubling crystal 814. After frequency doubling the resulting output preferably has a substantially same wavelength as at least part of the short wavelength components traveling in the arm 809. Additional optical elements 815 and 816 can be inserted into the beam paths of the arms 808 and 809 for spectral filtering, optical delay adjustment, as well as polarization control. Spectral filtering elements are selected to maximize the spectral overlap of the signals propagating in arms 808 and 809. As another example, the optical element 815 can comprise appropriate wave-plates that control the polarization state of the light in front of the doubling crystal 814.

The frequency-doubled light from the arm 808 and the light from the arm 809 are subsequently combined in a polarization-maintaining coupler 817 which preferably has a 50/50 splitting ratio. The beat signal from interference of the two beams injected into the coupler 817 is detected by a detector 818. The beat signal is related to the carrier envelope offset frequency $f_{ceo}$. The radio frequency (RF) spectrum of the detector signal comprises spectral components around $f_{n,rep}=n\,f_{rep}$ which are related to the repetition frequency of the laser, and around $f_{n,m,beat}=n\,f_{rep}+m\,f_{ceo}$ which are related to the beat signal between the repetition frequency $f_{rep}$ and the carrier envelope offset frequency $f_{ceo}$. In both cases the integer n indicates the harmonic number, and m has the value of −1 or +1.

As shown in FIG. 8A, one selected harmonic of the beat signal at frequency $f_{n,m,beat}$ may be directed via an electrical feedback circuitry 819 to the oscillator 801 and provides the necessary feedback to allow control of the carrier envelope offset phase. One selected harmonic of the repetition frequency signal at $f_{n,rep}$ may be used in a similar way to control the repetition rate of the oscillator 801.

To minimize the noise of the beat signal and to maximize the amplitude of the beat signal, additional elements may be used. For example, to increase or optimize the power of the frequency-doubled light, the doubling crystal 814 is preferably based on a periodically poled material such as a periodically poled LiNbO$_3$ (PPLN) in various embodiments. The length of the crystal 814 is preferably selected in a range of approximately 3-75 mm to minimize the spectral bandwidth of the frequency-doubled signal. Three-wave mixing in the PPLN greatly increases the acceptance bandwidth for frequency doubling, while ensuring a narrow bandwidth output. Such an effect is disclosed in the U.S. Pat. No. 5,880,877 to Fermann et al which is hereby incorporated herein by reference in its entirety. The generation of a narrow bandwidth output signal reduces the number of frequency components involved in the generation of a carrier envelope offset frequency beat and enhances the signal-to-noise ratio of the beat signal.

The beat signal can be further increased or maximized by ensuring temporal overlap between the interfering pulses impinging on the detector 818. Increased temporal overlap can be achieved by an adjustment of the length of coupler arm 809. Alternatively, additional glass (or semiconductor) plates can be inserted (for example, at the optical element 815) in the optical beam paths to obtain similar results.

An optical element 816a may be inserted in an optical path after the two arms 808, 809 are combined. The optical elements 816 and 816a that can be inserted into the arm 809 and in the combined signal arm before the detector 818 may comprise a narrow bandpass filter that narrows the spectral width of the signal transmitted through the arm 809. Such filtering can reduce or minimize the noise of the beat signal as well as avoid saturation of the detector 818. Convenient narrow bandpass filters can be constructed from, by way of examples, fiber gratings, bulk gratings or dielectric filters.

The radio frequency (RF) spectral width of the beat signal related to the carrier envelope offset phase slip can be reduced or minimized in a number of ways. One way is by the incorporation of a fiber grating into the fiber oscillator as well as a bandwidth-limiting element.

Another method for reducing the RF spectral width of the beat signal is to reduce the contribution of Raman processes in the continuum output. This task can be accomplished, for example, by using for continuum generation a short piece of nonlinear fiber comprising highly nonlinear Bismuth-oxide based optical glass with non-zero dispersion, preferably positive dispersion, at the emission wavelength of the laser.

Another way to reduce or minimize the RF spectral width of the beat signal is by reducing the dispersion of the seed oscillator. In the presence of a low oscillator dispersion, phase noise and consequently timing jitter of the oscillator are reduced or minimized, which in turn reduces or minimizes the variation of the carrier envelope beat frequency. For such fiber oscillators, the oscillator dispersion preferably is in a range of approximately (−10,000 to +2,500 fs$^2$/m)×L, where L is the intra-cavity fiber length. As an example, a Fabry-Perot oscillator operating at a repetition rate of 50 MHz and having an intra-cavity fiber length of L=2 m, the oscillator dispersion preferably should be in a range from approximately −20,000 fs$^2$ to +5,000 fs$^2$.

To produce an optical output of the frequency comb source which is used, for example, for a frequency metrology experiment, part of the frequency comb can be coupled out from a location 818b after the highly nonlinear fiber or from a location 818a after the coupler 817 and interferometer. The output can be coupled out, e.g., with broad band fiber optic couplers or with WDM fiber optical couplers, if for example only a certain spectral part of the comb is used. Other types of output couplers such as bulk optics or fiber Bragg gratings can also be used. The optical output can also be coupled out at a location 818d after the oscillator or at a location 818c after the amplifier, if for example only the spectral part of the oscillator or amplifier bandwidth of the comb is desired.

The amount and wavelength range of the optical signal out coupled is preferably chosen such that the beat signals obtained from detector 818 have sufficiently high signal/noise ratio for providing an effective feedback loop 819.

FIG. 8B now illustrates one possible embodiment of the oscillator 801 described above in reference to FIG. 8A. Such a design facilitates the generation of well-defined frequency combs. The design is very similar to the design described above in reference to FIGS. 1C and 2, and the use of a fiber grating allows a particularly compact construction.

The oscillator 801 includes a saturable absorber module 820 comprising collimation and focusing lenses 821 and 822 respectively. The saturable absorber module 820 further comprises a saturable absorber 823 that is preferably mounted onto a first piezo-electric transducer 824. The first piezo-electric transducer 824 can be modulated to control, for example, the repetition rate of the oscillator 801.

The oscillator 801 further comprises an oscillator fiber 825 that is preferably coiled onto a second piezo-electric transducer 826. The second piezo-electric transducer 826 can be modulated for repetition rate control of the oscillator 801. The oscillator fiber 825 is preferably polarization-maintaining and has a positive dispersion although the designs should not be so limited. The dispersion of the oscillator cavity can be compensated by a fiber grating 827 which preferably has a negative dispersion and is also used for output coupling. It will be understood that a positive dispersion fiber grating and a negative dispersion cavity fiber may also be implemented. Furthermore, the fiber grating 827 can be polarization-maintaining or non-polarization-maintaining.

A linear polarization output from the oscillator 801 can be obtained using appropriate splicing techniques as discussed above in reference to FIG. 1C and also as discussed in the U.S. patent application Ser. No. 10/627,069.

A fiber grating is preferred as a dispersion compensation element compared to a piece of fiber, in various embodiments, because a fiber grating enables essentially linear dispersion compensation as well as bandwidth limitation. Linear dispersion is provided in an optical element that does not produce substantially any nonlinear distortions. An optical fiber, for example, also produces dispersion; however, a fiber is much longer and therefore the pulses propagating in the fiber are subject to nonlinear distortions. In contrast, a fiber grating is relatively short and any nonlinear distortions may be neglected (at least for the power levels obtainable with a modelocked oscillator). A reduction of the bandwidth of the laser reduces the amount of timing jitter inside the laser, and the linear dispersion compensation allows a more stable laser operation with increased pulse energy inside the cavity.

Instead of a fiber grating, a bulk grating dispersion compensation element (not shown) could also be incorporated into the cavity. For example, a bulk grating dispersion compensation element comprising two parallel bulk gratings could be incorporated between the lenses 821 and 823 in the saturable absorber module 820. Furthermore, as an alternative to the bandwidth-limiting by the fiber grating, an optical bandpass filter (not shown) could also be incorporated inside the cavity. For example, such a filter could also be located between the lenses 821 and 823. Other designs and the use of other dispersive components are also possible.

The pump light for the oscillator 801 can be directed via a polarization-maintaining wavelength division multiplexing coupler 828 from a coupler arm 829 attached to a preferably single-mode pump diode 830. The pump current to the pump diode 830 can be modulated to stabilize the beat signal frequency and the carrier envelope offset frequency using feedback based on the signal at one selected frequency $f_{n,m,beat}$ or f(n,m, beat) from the detector 818. This selected frequency f(n,m,beat) can be isolated from the detector signal using an RF bandpass filter which rejects other harmonics of $f_{n,m,beat}$ or $f_{n,rep}$.

Figure 8C:
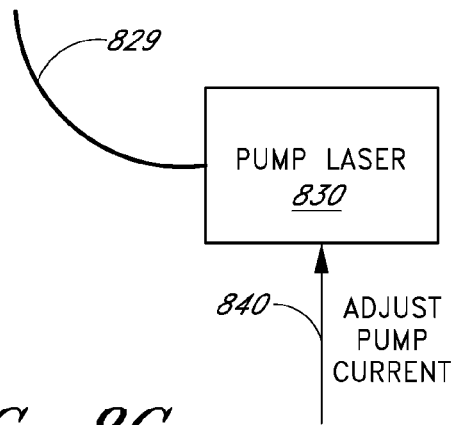
FIGS. 8C-8E illustrate some of the possible approaches for controlling the beat signal related to the carrier envelope offset frequencies associated with the system of FIG. 8A.
Figure 8D:
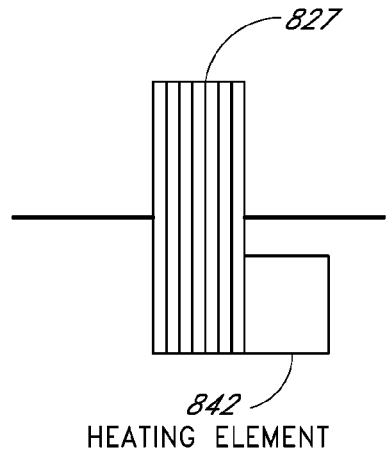

FIGS. 8C-D illustrate some of approaches to using the beat signal frequency to control the repetition rate as well as the carrier envelope offset frequency. As shown in FIG. 8C, a pump current 840 can be changed, wherein a change in the pump current can cause a change of the beat signal frequency and more particularly the carrier envelope offset frequency. This dependence can be used to phase lock the beat signal frequency (e.g., n $f_{rep}$+m $f_{ceo}$) to an external clock in a similar way as a voltage-controlled oscillator in a traditional phase locked loop can be used. This external clock may comprise for example a Rb clock which provides a 10 MHz reference phase locked to a Rb microwave transmission. The clock and reference can be coupled to a frequency synthesizer that provides the suitable frequency for a phase detector that locks the frequency from the synthesizer with the beat signal frequency. In various preferred embodiments, the beat signal frequency may be multiplied, divided or otherwise processed appropriately to facilitate locking to a reference. The clock reference for phase locking $f_{ceo}$ can also be a harmonic or sub-harmonic of the repetition rate of the oscillator $f_{rep}$. Using this scheme, a frequency comb line can be locked to a stable optical reference and the repetition rate of the oscillator can be used as an RF signal which is then frequency locked to the optical reference (optical clock).

Figure 8E:
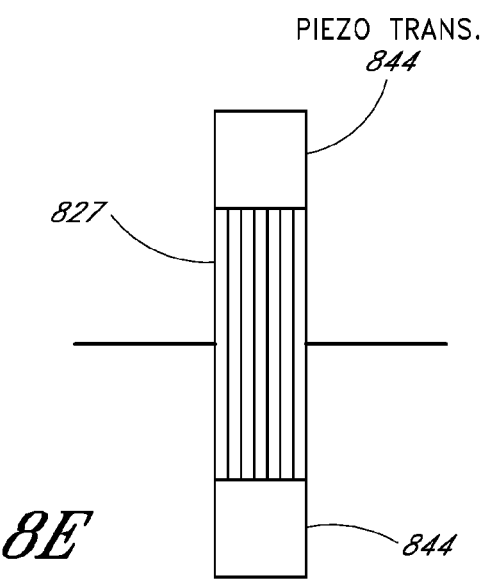

As shown in FIGS. 8D and 8E, the absolute position of the $f_{ceo}$ can be controlled by adjusting the temperature of the fiber grating 827 with a heating element 842. Alternatively, pressure applied to the fiber grating 827 can also be used to set the $f_{ceo}$ using for example a piezo-electric transducer 844. Since the pressure applied to the fiber grating 827 can be modulated very rapidly, modulating the pressure on the grating 827 can also be used for phase locking $f_{ceo}$ to an external clock. Slower drifts of $f_{ceo}$ can then be controlled by additionally varying the temperature of the fiber grating 827, preferably ensuring that the modulation of the laser diode current stays substantially always within the modelocking range of the oscillator 801. Preferably, such a grating 827 used to introduce controllable amounts of phase shift and thereby control $f_{ceo}$ by applying pressure or temperature changes thereto is chirped.

As shown in FIG. 8B, the dependence of the repetition rate of the laser on the voltage at the piezo-electric transducers 826 and 824 can be used to phase lock one selected harmonic $f_{n,rep}$ of the photodetector signal to an external clock. Such transducers preferably alter the cavity length and thereby adjust the repetition rate $f_{n,rep}$. The transducers, may, however, affect the $f_{ceo}$ as well. For example, applying pressure to the fiber may cause stress that varies the index of refraction and dispersion of the optical fiber. Resultant changes in phase may shift $f_{ceo}$. With several feedback loops for $f_{n,rep}$ and $f_{ceo}$, however, the dependency of both $f_{n,rep}$ and $f_{ceo}$ on the stimulus provided by the transducers can be decoupled. The decoupling can be achieved by operating the feedback loops at different bandwidth or using orthogonalization circuitry. Other techniques for decoupling may be employed as well.

Although several configurations for controlling the $f_{ceo}$ and $f_{rep}$ based on feedback from the interferometer are described above, other approaches are possible. For example, instead of varying pump power to the oscillator to varying self-phase modulation and thereby influence the phase to adjust $f_{ceo}$, other mechanisms that influence phase may be employed as well. Other components can be disposed in the path of the signal to introduce controllable phase variation. Other techniques for varying $f_{rep}$ may be employed as well. Multiple feedback loops having different response times may also be utilized to provide effective control.

FIGS. 8A and 8B describe the basic design of a frequency comb source based on a low noise phase-locked fiber laser for frequency metrology. Several modifications to this basic design can be easily implemented as described below.

Figures 8F, 8G:
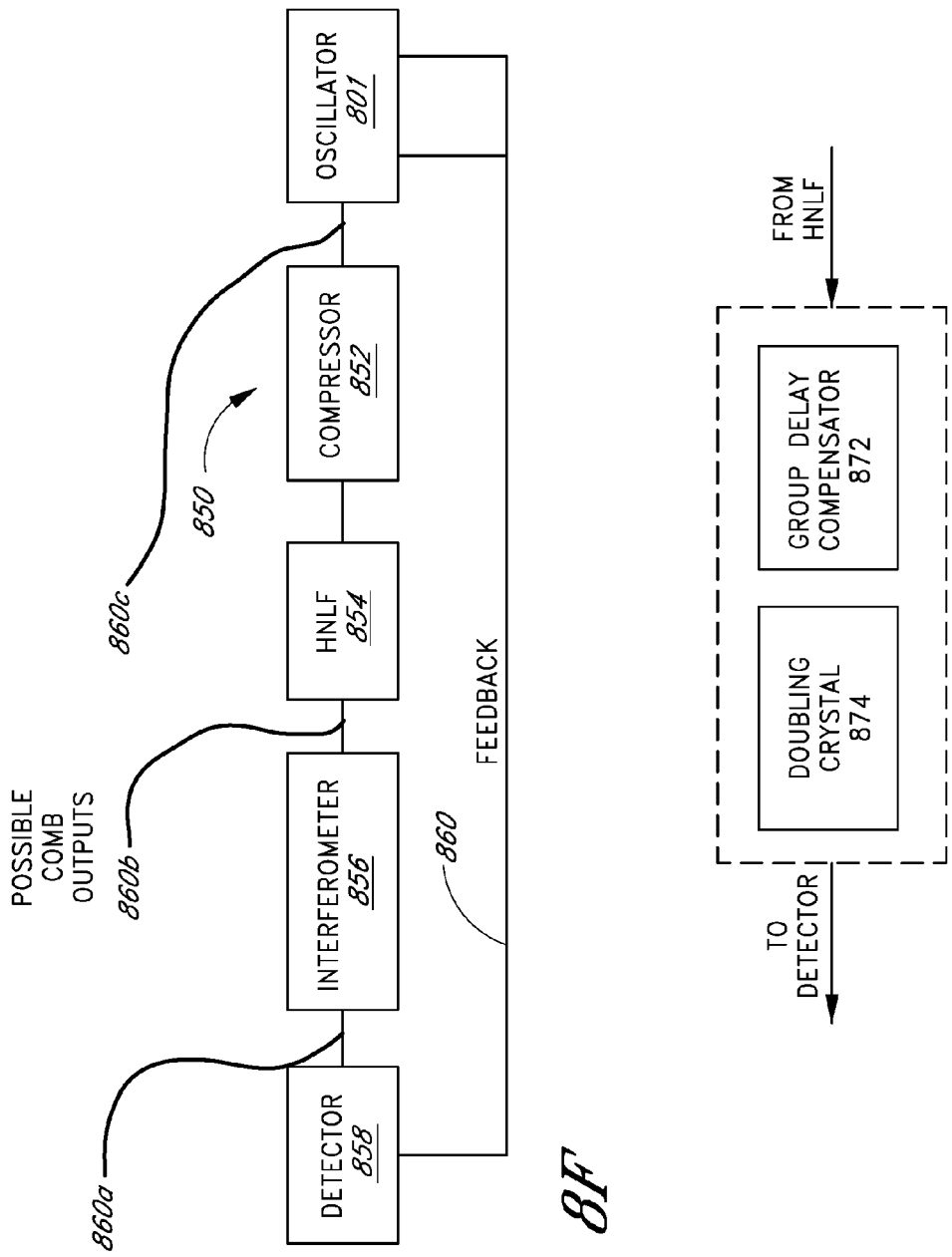
FIGS. 8F and 8G illustrate a schematic diagram of one embodiment of a polarization maintaining fiber oscillator that facilitates generation of carrier envelope offset frequency beats for precision frequency comb generation.

FIG. 8F illustrates one embodiment of a fiber based continuum source 850 where the amplifier (803 in FIG. 8A) is omitted. Since continuum generation may involve a pulse energy of around 1 nJ, the amplifier 803 can be omitted in such a fiber based continuum source. Absolute phase locking with an oscillator-only system may be more stable compared to an oscillator-amplifier system and therefore preferable in certain applications. In the exemplary continuum source 850, high quality sub-200 fs pulses are preferably injected into a highly nonlinear fiber 854 (805 in FIG. 8A). To generate such short pulses, the oscillator-only continuum source 850 preferably generates positively chirped pulses in the oscillator 801, which are compressed in an appropriate length of a negative dispersion fiber 852 before injection into the highly nonlinear fiber 854. For the oscillator-only continuum source 850, the amplifier is thus substituted with the negative dispersion fiber 852. Such negative dispersion fiber can be constructed from, by way of example, conventional silica fiber, holey fiber or photonic bandgap fiber. Even the oscillator-amplifier continuum source 800 of FIG. 8A can benefit from the insertion of a length of dispersion compensation fiber (not shown in FIG. 8A) before injection into the highly nonlinear fiber 805.

As shown in FIG. 8F, the oscillator-only continuum source 850 further comprises an interferometer 856 that interferes the two frequency components as described above. The interferometer 856 may be similar to the two-arm interferometer shown in FIG. 8A (fiber based or equivalent bulk optics components), or may be similar to a one-arm interferometer described below. The output of the interferometer 856 can be detected by a detector 858, and selected signals from the detector 858 can be used for feedback control 860 in a manner similar to that described above in reference to FIGS. 8A-8E. FIG. 8F additionally shows possible comb outputs 860a, 860b, and 860c.

FIG. 8G illustrates an exemplary one-arm interferometer 870. Such an interferometer can be obtained by removing one of the arms (arm 809 in FIG. 8A) and modifying the remaining arm. As shown in FIG. 8G, the interferometer 870 comprises a group delay compensator 872 inline with a doubling crystal 874. The group delay compensator 872 receives a continuum signal from a highly nonlinear fiber located upstream, and ensures that the frequency doubled and non-doubled spectral components from the continuum that are output from doubling crystal overlap in time. Moreover, since the doubled and non-doubled spectral components are selected to overlap in optical frequency, these components interfere and the interference signal is detected with a detector downstream.

In the exemplary one-arm interferometer setup of FIG. 8G, the time-overlap of the two interfering signals can be controlled by the group delay compensator 872 that compensates the group delay of the doubled and non-doubled frequency components acquired during the propagation in the highly nonlinear fiber and in the doubling crystal. The group delay compensator 872 provides an appropriate negative group delay. If for example the dispersion is such that the group velocity of the frequency doubled components exceed the group velocity of the non-doubled frequency components, the group delay compensator preferably includes a medium having opposite dispersion such that the group velocity of the frequency doubled components is lower than that of the non-doubled frequency components so to provide suitable compensation. Preferably, suitable phase delay is provided such that the frequency doubled pulses and the non-frequency doubled pulses substantially overlap in time to obtain increased or maximal interference. This group delay compensator may be implemented by one or more components, which may include, for example, dispersive optical fiber, waveguides, or other transmissive or reflective optical elements. When using dispersive optical fibers or waveguides, those elements can be spliced directly to the highly nonlinear fiber, ensuring a compact set-up.

In the exemplary one-arm interferometer setup of FIG. 8G, the delivery fiber to the photodetector can be omitted. However, fiber delivery is preferred to facilitate spatial overlap of the two interfering signals.

In one exemplary design (Design Example #3) corresponding to the supercontinuum generation and absolute phase locking according to FIG. 8A, the oscillator delivers approximately 2 ps positively chirped pulses with a bandwidth of approximately 20 nm at a repetition rate of approximately 51 MHz and a wavelength of approximately 1.56 µm. The oscillator fiber 825 comprises an approximately 1 m long Er-doped fiber with a dispersion per unit length of approximately +70,000 $fs^2$/m. The fiber grating 827 has a dispersion of approximately −100,000 $fs^2$ and a reflection bandwidth of approximately 40 nm centered at a wavelength of approximately 1560. The reflectivity of the grating is approximately 10%. An additional approximately 1 m long fiber-grating pigtail having a dispersion per unit length of approximately −20,000 $fs^2$/m is part of the oscillator cavity 801. The overall cavity dispersion is thus ≈0 $fs^2$ and substantially smaller than the absolute dispersion of the various cavity elements.

The working example (Design Example #3) uses a non-polarization-maintaining oscillator fiber as well as non-polarization-maintaining fiber couplers. Therefore an additional waveplate and a rotatable polarizer are inserted between the lenses 821 and 822 (polarizer adjacent the lens 822, and waveplate adjacent the lens 821). The addition of polarization control further allows exploitation of nonlinear polarization evolution inside the laser to stabilize mode-locked operation. Additional information about the nonlinear polarization evolution in fiber lasers can be found in the U.S. Pat. No. 5,689,519 to Fermann et al which is hereby incorporated herein by reference in its entirety.

The saturable absorber 823 is substantially similar to that described above in reference to the working Design Example #2. Here, because of the short lifetime of the saturable absorber 823, nonlinear polarization evolution can also be used as a nonlinear limiting mechanism, further reducing the noise of the oscillator 801 and the noise of the generated carrier envelope offset frequency. The oscillator 801 may be pumped with a power up to approximately 500 mW.

The amplifier 803 has a length of approximately 1 m, a dispersion of approximately −20,000 $fs^2$, and a core diameter of approximately 9 µm to minimize the nonlinearity of the amplifier 803. The amplifier 803 in this working example is polarization-maintaining. The amplifier 803 is pumped with a power up to approximately 400 mW.

After the amplifier 803, approximately sub-70 fs pulses with an average power up to approximately 120 mW are obtained. The amplified pulses are injected into the highly nonlinear fiber 805. The length of fiber 805 is approximately 10 cm long, and the fiber 805 has a second-order dispersion per unit length less than approximately 2000 $fs^2$/m, where a range of −5000 $fs^2$/m to +2000 $fs^2$/m is preferable. The highly nonlinear fiber 805 yields a coherent continuum spanning from approximately 1100-2300 nm.

For frequency doubling the approximately 2200 nm wavelength light, an approximately 4 mm length of PPLN crystal 814 is used. The non-doubled light at approximately 1100 nm from the interferometer arm 809 and the doubled light from the arm 808 are combined and overlapped temporally in the coupler 817. The resulting carrier envelope offset frequency beat signal has a spectral width of approximately 200 kHz, which allows for absolute phase-locking of the oscillator 801 via modulation of the pump current to the oscillator 801 with a phase-locked loop with a bandwidth of approximately 300 kHz.

Figure 9A:
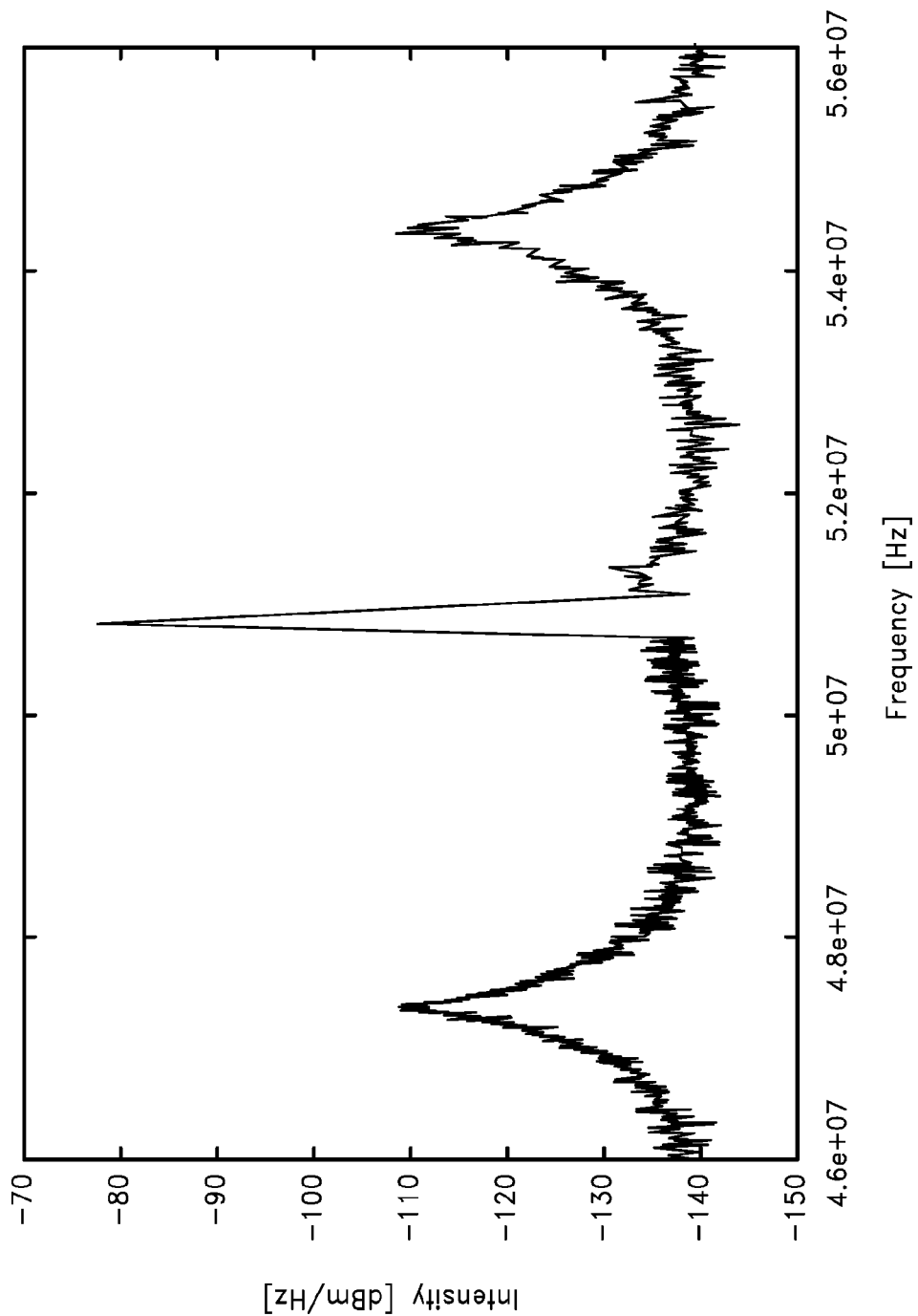
FIG. 9A illustrates an exemplary measurement of a free-running carrier envelope offset frequency obtained with a modelocked fiber laser according to one embodiment of the present teachings.

FIG. 9A illustrates a typical measurement of a carrier envelope offset frequency beat signal. Here both the frequency related to the repetition rate of the laser at approximately 51 MHz is shown as well as the beat signals at approximately 47 MHz and 55 MHz. The spectral width of the beat signal less than approximately 200 kHz is comparable to the widths achieved with frequency comb sources based on conventional Ti:sapphire lasers. Hence this result further illustrates the unique utility of fiber based supercontinuum sources. The significant advantage obtained by packaging a frequency comb source based on fiber lasers does not correspond to a reduction in precision. The generation of a narrow bandwidth carrier envelope offset frequency beat signal is important for the long-term stability and accuracy of the frequency combs generated with a modelocked fiber laser incorporating absolute phase control.

Figure 9B:
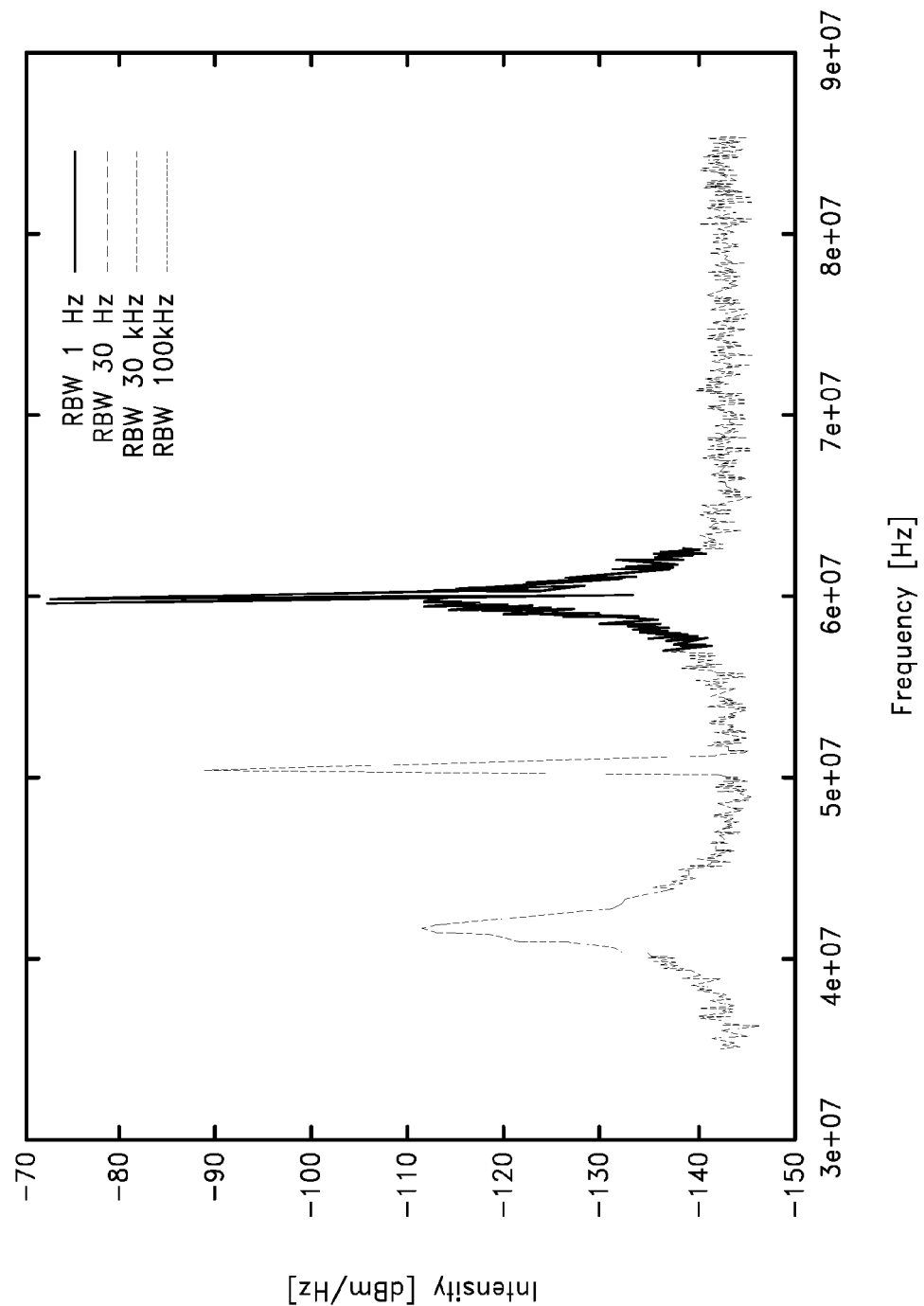
FIG. 9B illustrates an exemplary measurement of a phase locked carrier envelope offset frequency obtained with a modelocked fiber laser according to one embodiment of the present teachings.

FIG. 9B illustrates an exemplary RF spectrum of a frequency comb source described above in reference to FIG. 8A, with a locked carrier envelope offset frequency. Here the carrier envelope offset frequency at approximately 60 MHz is locked to a frequency standard at approximately 10 MHz which is locked to the Rb-atomic transition. Another frequency synthesizer is locked to this frequency standard to provide the reference signal at approximately 60 MHz. Various RF resolution bandwidths (RBW) shown in FIG. 9B further illustrate the difference of a locked carrier envelope offset frequency compared to an unlocked carrier envelope offset frequency as shown in FIG. 9A. Note that various resolution bandwidths have been implemented only on the peak centered at 60 MHz. The narrow spectral peak was obtained with a resolution bandwidth of 1 Hz and has an intensity up to −70 dBm/Hz. The noise floor for the 60 MHz signal is observed at around −112 dBm/Hz and was measured with a resolution bandwidth of 100 kHz; the noise floor is the same as seen on the peak located at 40 MHz. The transition from a resolution bandwidth of 1 Hz to 100 kHz cannot be distinguished on FIG. 9B.

As described above, generation of a narrow bandwidth beat signal is substantially enhanced by the use of a low dispersion oscillator cavity in conjunction with the use of a bandpass filter. This concept is further illustrated in FIG. 10A. A fiber oscillator 1000 comprises a range of intra-cavity fibers 1001, 1002 (only two are shown for simplicity) with different dispersion characteristics.

Additional cavity elements comprise an element 1003 allowing for pump injection and also output coupling. Such an element can for example comprise a fiber coupler for directing pump light into the cavity as well as an additional coupler for directing an output signal out of the cavity and to the other system components.

Saturable absorber element 1004 can be used to initiate passive modelocking. An element 1005 comprises a bandpass filter. An element 1006 can be an element allowing for polarization control, and can comprise a polarizer as well as two rotatable waveplates, where the polarizer is located closer to a reflector 1007.

Both fiber pigtailed cavity components as well as bulk optic cavity components can be used in the cavity 1000. Also, although the cavity 1000 is shown as a Fabry-Perot cavity, a ring-cavity design is also possible. Preferably a bandpass filter is included with an adjustment of the total absolute cavity dispersion smaller than approximately (10,000 $fs^2$/m)×L, where L is the intra-cavity fiber length. In various embodiments, for example the dispersion may be about 20,000 $fs^2$ or less, about 10,000 $fs^2$ or less, or about 5,000 $fs^2$ or less, although the ranges should not be limited to these.

The noise of such fiber oscillators for frequency-metrology can generally be reduced or minimized by the implementation of low noise diode pump lasers. Such low noise diode pump lasers are characterized by low residual intensity noise (RIN). High performance sources can deliver a RIN noise as low as approximately −150 dB/Hz and lower. In comparison, a standard grating stabilized pump source can produce a RIN noise of approximately −130 dB/Hz. Such pump sources have been developed for forward pumped fiber Raman amplifiers and can substantially enhance the performance of fiber based frequency standards. Note that such low RIN noise pump sources are not single-mode, however, due to a large frequency spacing of the modes in these pump sources being greater than approximately 10 GHz. Any beating between the modes has substantially no adverse effect on the stability of an Er-based laser, because of the long Er life-time (10 milliseconds), which averages such high frequency modulations.

Figure 10A:
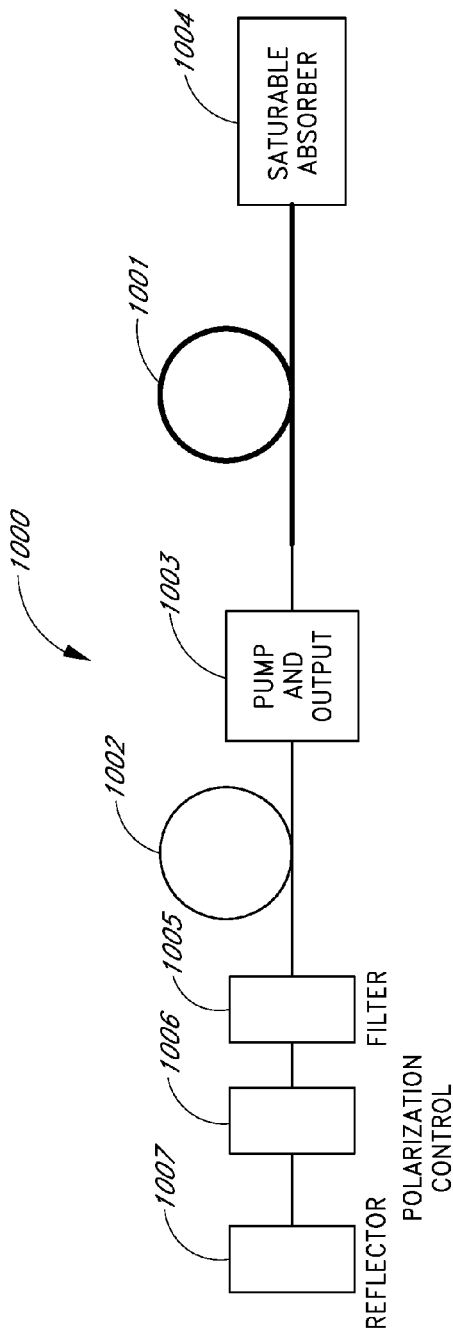
FIG. 10A illustrates a schematic diagram of one embodiment of a low noise fiber oscillator design that can generate narrow bandwidth carrier envelope offset frequency beats for precision frequency comb generation.
Figure 10B:
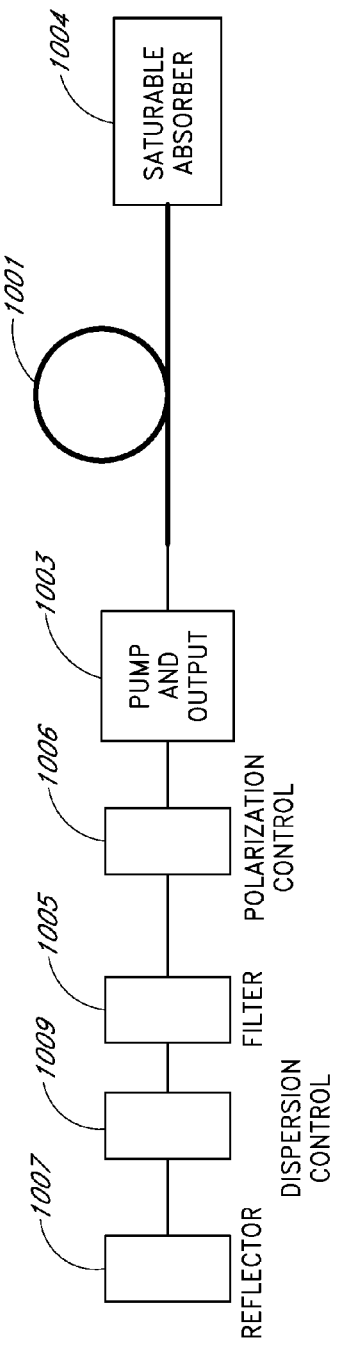
FIG. 10B illustrates a schematic diagram of another embodiment of a low noise fiber oscillator design that can generate narrow bandwidth carrier envelope offset frequency beats for precision frequency comb generation.

FIG. 10B illustrates another embodiment of a cavity 1008 where instead of fibers with different dispersion characteristics, a bulk dispersion compensating element can be included inside a dispersion-compensated fiber laser suitable for precision metrology. The cavity 1008 comprises similar elements 1001, 1003, 1004, 1005, 1006, and 1007 as the cavity 1000 described above in reference to FIG. 10A. The cavity 1008 further comprises an additional dispersion compensation element 1009 such as a grating or a prism pair. Additionally, one or more Gires-Tournois interferometers or dispersive mirrors can also be used to achieve dispersion compensation. Other configurations are also possible.

Both the Gires-Tournois interferometer and the dispersive mirror can be used instead of the reflector element 1007. The use of the dispersive mirrors and Gires-Tournois interferometers becomes practical for intra-cavity fiber lengths that are shorter than approximately 10 cm. Hence, such systems can be used for fiber or generally waveguide-based optical comb sources operating with pulses having repetition rates about 1 GHz and higher. At repetition rates of about 1 GHz, the use of dispersion compensated waveguide cavities for frequency comb sources is not needed, because of the reduced dispersion of such short cavities compared to a cavity using a waveguide length on the order of approximately 2 m. Hence high repetition rate waveguide-based frequency comb sources as shown in FIG. 10B may allow the elimination of the dispersion compensating element (such as the dispersive mirrors, Gires-Tournois interferometers and the element 1009) altogether. As emphasized herein, particularly compact oscillator implementations are further enabled by the replacement of the reflector element 1007 with a waveguide grating.

It will be appreciated that the order of the various cavity elements in FIGS. 10A and 10B are exemplary, can be modified. As an example, the cavity elements 1005 (filter) and 1006 (polarization control) are arranged differently in FIGS. 10A and 10B but collectively operate similarly.

Figure 11:
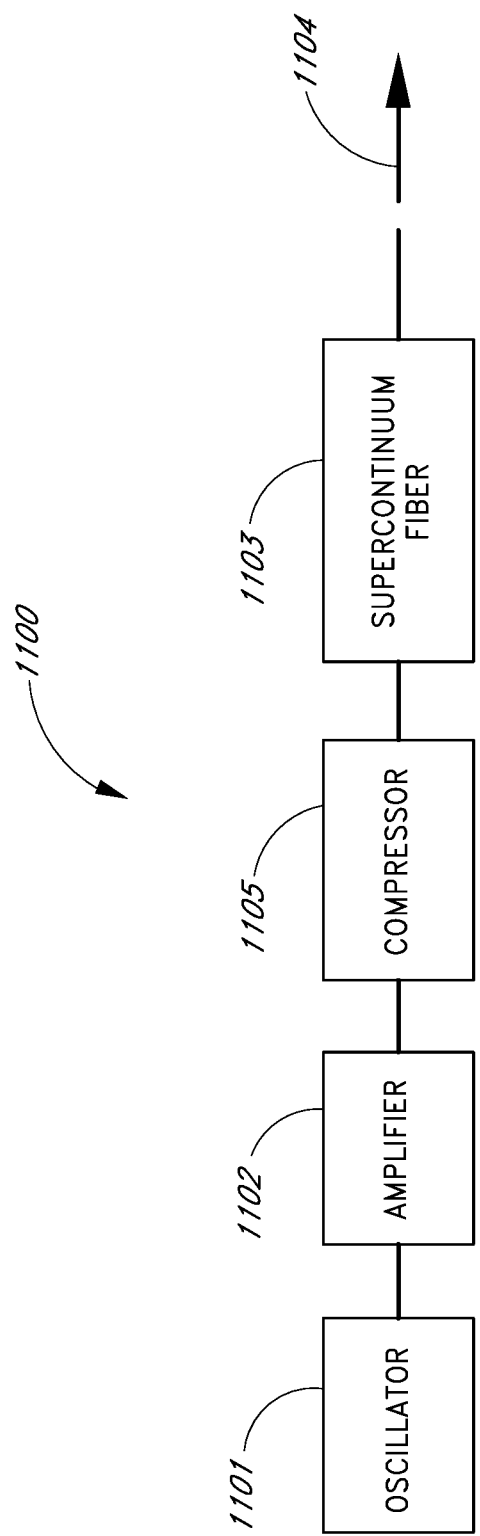
FIG. 11 illustrates an embodiment of a possible design of a supercontinuum device.

FIG. 11 illustrates a generic waveguide-based supercontinuum source 1100 comprising polarization-maintaining elements. For industrial applications of supercontinuum sources and waveguide-based frequency combs, system designs based on polarization-maintaining elements are preferable. The supercontinuum source system 1100 comprises an oscillator 1101 with a single-polarization output. The oscillator 1101 can be based, for example, on designs described above in reference to FIGS. 1C, 4, 8A, and 8B. Alternatively, environmentally stable cavity designs may be based on combinations of polarization-maintaining and non-polarization-maintaining fibers (or non-polarization-maintaining fibers only) in conjunction with Faraday rotators. Such designs are described in greater detail in the U.S. Pat. No. 5,689,519 to Fermann et al, which is hereby incorporated herein by reference in its entirety.

The oscillator output is then preferably injected into a polarization-maintaining fiber amplifier 1102. The amplifier 1102 can also be constructed from a non-polarization-maintaining fiber in conjunction with a Faraday rotator mirror. For high output power oscillators the amplifier 1102 may be omitted. Preferably, however, the amplifier 1102 is operated in a nonlinear regime, such that the amplified pulses are subjected to substantial levels of self-phase modulation, producing appreciable spectral broadening in the amplifier output. Therefore, because of the large levels of self-phase modulation typically incurred in the pulse compressing fiber amplifier, polarization-maintaining fiber amplifiers are preferred for environmental stability.

The output from the amplifier 1102 can further be compressed by a compressor element 1105. The compressor element 1105 can comprise, by way of example, a holey fiber, a photonic band gap fiber or a conventional fiber. The compressor element 1105 can also comprise bulk diffraction gratings, fiber gratings or periodically poled second-order nonlinear elements such as a chirped PPLN. The chirped PPLN combines pulse compression with second-harmonic generation, which is used to change the center wavelength of the supercontinuum source. Other approaches for providing compression are also possible.

As an example of a chirped PPLN in conjunction with an Er-fiber laser system, a supercontinuum source centered near 800 nm can be generated, in direct competition with conventional Ti:sapphire based systems. The compressor can generate pulses with a width of less than approximately 200 fs, preferably less than approximately 100 fs and most preferably less than approximately 70 fs to preserve coherence in supercontinuum generation. The compressor preferably also preserves polarization.

For the case of a chirped PPLN compressor, polarization preservation is substantially automatic. When using a photonic bandgap fiber for pulse compression, the use of non-centro-symmetric fiber designs is preferred.

As shown in FIG. 11, at least one highly nonlinear fiber 1103 is inserted after the compressor stage 1105 to generate the supercontinuum. The fiber 1103 is preferably also polarization-maintaining, but since only very short lengths (approximately 5 mm-25 cm) of supercontinuum fiber are used in certain designs, non-polarization-maintaining highly nonlinear fibers are also acceptable. The highly nonlinear fibers can be constructed from by way of example, holey fibers, gas filled photonic bandgap fibers, as well as conventional optical fibers. An output 1104 from the system 1100 can then be used for absolute phase locking of the oscillator 1101.

Figure 12:
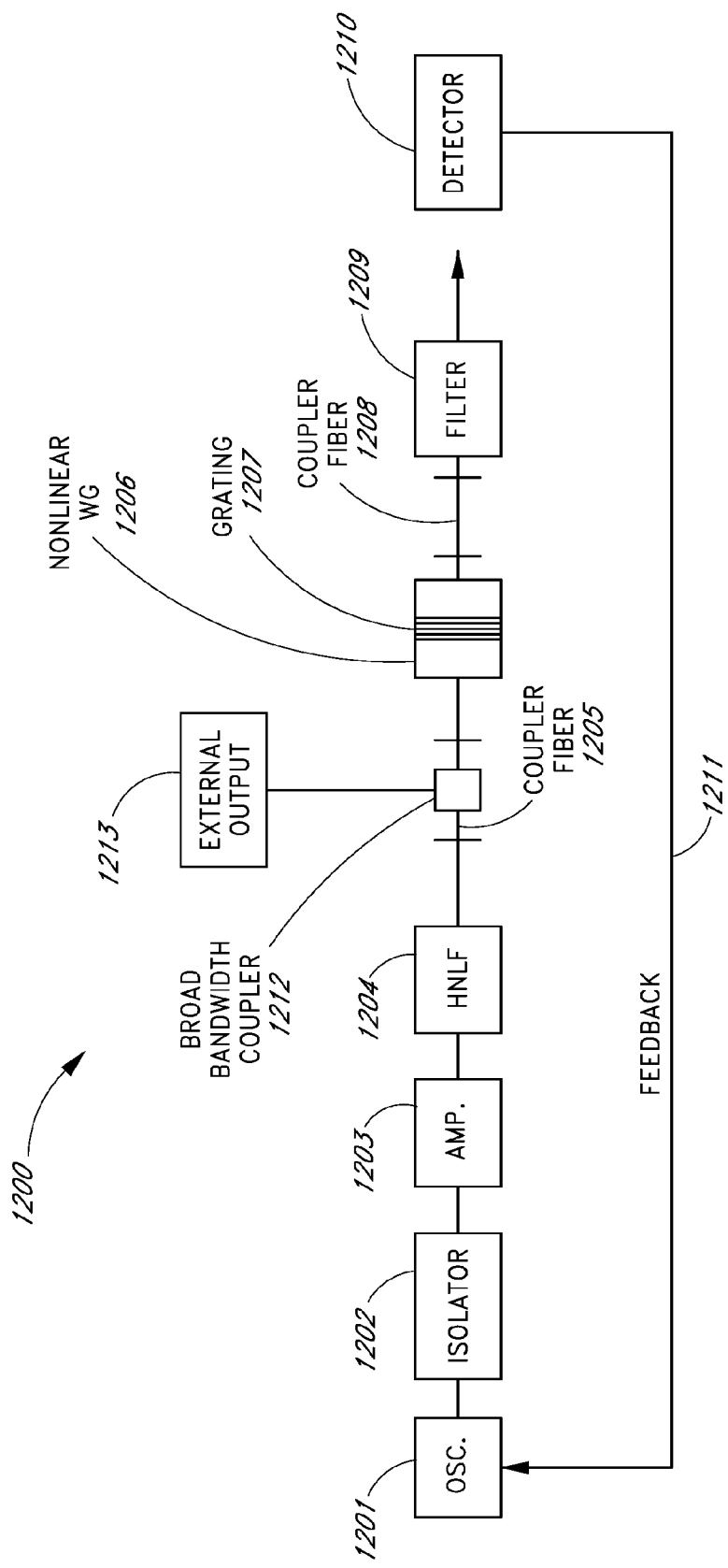
FIG. 12 illustrates a schematic diagram of one embodiment of a highly integrated frequency comb source with an in-line configuration.

FIG. 12 illustrates one embodiment of a highly integrated frequency comb source 1200. Preferably such a system is substantially fiber-based, having mainly fiber components. Such a highly integrated system is more preferable for mass application of this technology than systems that use many separate bulk components (such as bulk doubling crystals) for the f-2f interferometer. Compact size and ruggedness are some examples of advantages of such systems.

The highly integrated system 1200 comprises an oscillator 1201, an isolator 1202, an amplifier 1203, and a highly nonlinear fiber 1204 that perform similar roles as those described above in reference to FIG. 8A (801, 802, 803, and 805). The isolator 1202 and/or amplifier 1203 may be excluded from this system 1200 as discussed above. The nonlinear fiber 1204 may also be implemented by other elements as well. The system 1200 further comprises one or more additional coupling fibers 1205 that are spliced to the highly nonlinear fiber 1204 so as to provide approximate mode-matching to a nonlinear waveguide 1206. The coupling fiber 1205 enables coupling of the supercontinuum output from the highly nonlinear fiber 1204 to the nonlinear waveguide 1206.

The nonlinear waveguide 1206 is preferably single-mode for both red and blue ends of the supercontinuum, and can for example be based on a $LiNbO_3$ waveguide. A periodically poled grating section 1207 can be further included in the nonlinear waveguide 1206 to frequency-double the red-part of the supercontinuum thereby enabling interference with the non-doubled (blue) part of the supercontinuum. In this inline interferometer design, one arm of the interferometer includes the frequency multiplier 1207 that produced the frequency doubled components. The frequency doubled components interfere with the non-frequency doubled components in the one arm thereby producing beat frequencies in the one arm. The position of grating 1207 within nonlinear waveguide 1206 and the length of coupling fiber 1205 can be selected to facilitate temporal overlap of the doubled and non-doubled parts of the supercontinuum. As described above, preferably, opposite group velocities (e.g., dispersions) at least partially offset phase delays for the doubled and non-doubled frequency components of the continuum.

The system 1200 further comprises a coupling fiber 1208 that couples the light out of the waveguide 1206. An optical bandpass filter 1209 can be inserted in front of a detector 1210. The detector 1210 can be used to observe the carrier envelope offset frequency beat signal as well as the repetition rate of the oscillator in a manner similar to that described above in reference to FIG. 8A. The bandpass filter 1209 can be selected to transmit substantially only those parts of the supercontinuum spectrum that actually contribute to the beat signal.

The system 1200 further comprises a feedback line 1211 that provides feedback(s) to control the repetition rate and the absolute phase of oscillator 1201. The system 1200 may further comprise a broad-bandwidth coupler 1212 inserted into the coupling fiber 1205 to extract the stabilized frequency combs to an external output 1213 for external applications.

Figure 13:
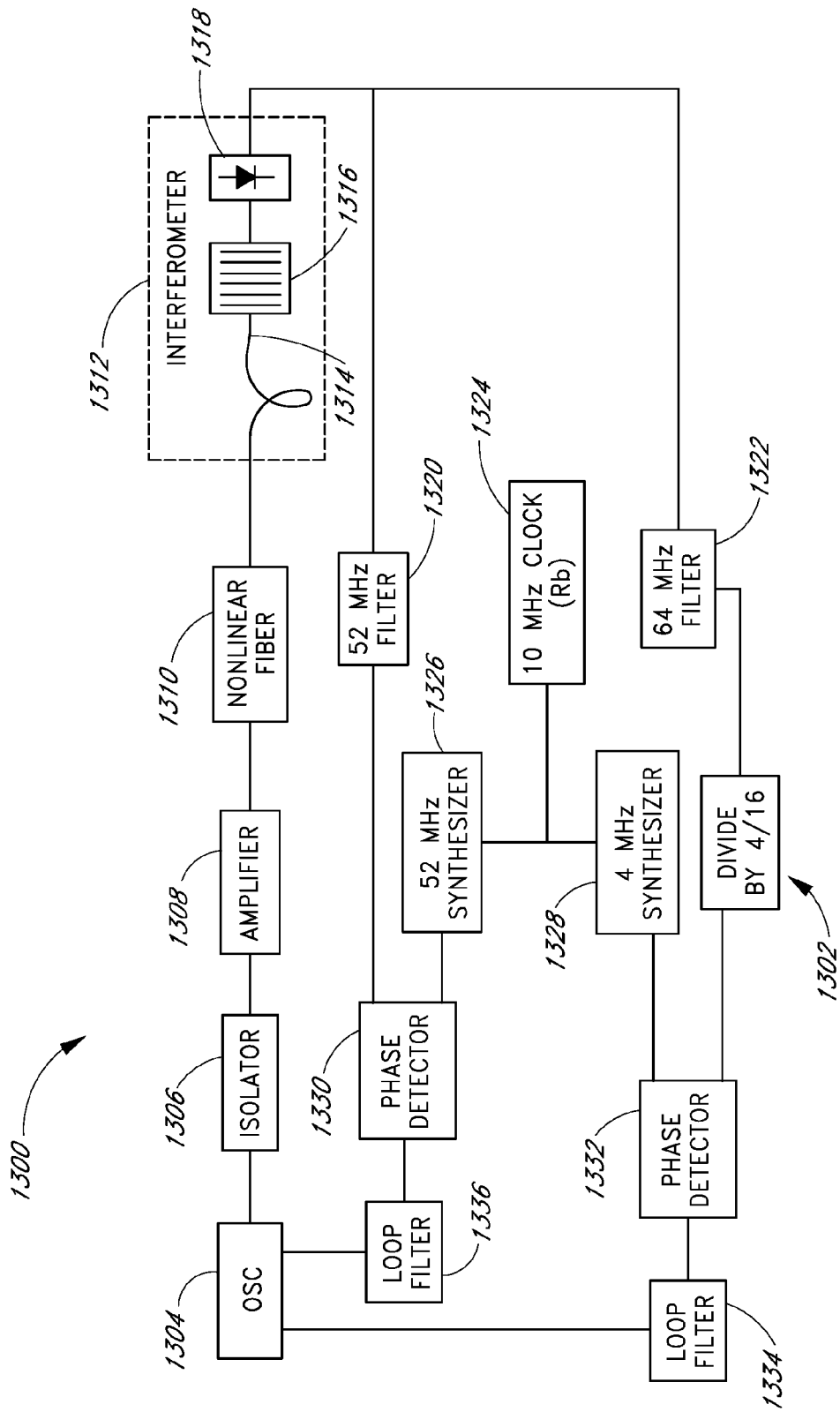
FIG. 13 illustrates a schematic diagram of one embodiment of a frequency comb source with a single arm interferometer and a feedback system connected thereto.

Another example of an in-line fiber laser system 1300 with a feedback loop section 1302 for phase locking $f_{ceo}$ is shown in FIG. 13. This in-line system 1300 includes a laser oscillator 1304, an isolator 1306 (optional), an amplifier 1308 (optional), and a highly nonlinear optical fiber 1310. The oscillator 1304, amplifier 1308, and nonlinear medium 1310 preferably substantially comprise fiber optic components, however, other types of non-fiber devices may be employed as well. For example, highly nonlinear waveguide structures may also be incorporated.

The oscillator 1304 may be mode-locked with a passive mode-locking element such as a saturable absorber that comprises one of a pair of reflective optical elements that forms a resonant cavity in the oscillator. Other configurations and designs to accomplish mode-locking, however, are possible. Mode-locking the oscillator 1304 results in a train of optical pulses with a corresponding frequency spectrum. Propagation of these pulses through the highly non-linear medium 1310 yields a large spectrum of frequencies referred to above as a continuum or supercontinuum, which is preferably at least one octave.

A single arm interferometer 1312 having a single arm 1314 disposed in the optical path of the output of the highly nonlinear fiber 1310 includes a frequency doubler 1316 or generally a nonlinear crystal waveguide in the single arm. The frequency doubler 1316 generates a second set of frequencies as well as a corresponding second train of optical pulses. Other components or elements that produce a second set of frequency components (and second set of pulses) may be used in other embodiments. For example difference frequency generation in a nonlinear crystal may also be implemented. This second set of frequency components are preferably shifted in frequency with respect to the first set of frequency components, however, as described above, the optical pulses corresponding to this second set of frequencies preferably temporally overlap the first set of pulses. This second set of frequency components may be a multiple or a fraction of the first set of frequency components.

The first and second trains of pulses interfere with each other in the single arm 1314 of the single arm interferometer 1312 yielding an optical interference signal that is detected by an optical sensor 1318. Beat frequencies from the first and second sets of frequency components are provided in an electrical output from the optical sensor 1318.

The feedback system 1302 includes electronic filters 1320, 1322 that isolate beat frequencies, $f_{rep}$ and $f_{rep}+f_{ceo}$. In the example shown in FIG. 13, these frequencies correspond to 52 MHz and 64 MHz, respectively. A clock 1324, such as a Rb clock with a 10 MHz oscillation frequency, can be utilized as a reference for phase locking to the beat frequencies. Frequency synthesizers 1326, 1328 transforms the 10 MHz oscillation reference into a useful frequency for synchronization. In the design shown in FIG. 13, the frequency synthesizers 1326, 1328, yield a 52 MHz and 4 MHz synch, respectively. The 52 MHz synchronization signal is phase locked to the $f_{rep}$ using a first phase detector 1330 that provides feedback to a piezo or other electro-mechanical transducer that alters the cavity in the oscillator 1304 and thereby shifts the repetition frequency. The beat frequency, $f_{rep}+f_{ceo}$ passed through the 64 MHz filter 1322, is scaled down (here by a factor 16) and compared to the 4 MHz synch signal by a second phase detector 1332. Phase locking of this beat frequency is accomplished by adjusting the pump power to the oscillator 1304 so as to alter the $f_{ceo}$ accordingly. Loop filters 1334, 1336 are included in the feedback paths to the oscillator. Other designs, configurations, and arrangements can be implemented as well.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A frequency comb source comprising:
   a mode-locked fiber oscillator comprising optical fiber disposed in an optical cavity;
   a non-linear optical element disposed to receive pulsed output from said mode-locked fiber oscillator and to generate a supercontinuum comprising a first train of optical pulses having a first set of frequency components;
   an interferometer disposed to receive said first train of optical pulses, said interferometer comprising a frequency converter comprising a nonlinear waveguide and configured to generate a second train of optical pulses having a second set of frequency components that are shifted in frequency with respect to the first set of frequency components, said second train of optical pulses temporally overlapping said first set of optical pulses, said interferometer configured to interfere at least a portion of said first train and said second train of optical pulses to generate an optical interference signal comprising beat frequencies; and
   an optical detector configured to detect said optical interference signal and output said beat frequencies.

2. The frequency comb source according to claim 1, wherein said interferometer comprises an f to 2f interferometric arrangement.

3. The frequency comb source according to claim 1, wherein said non-linear optical element comprises a highly non-linear fiber.

4. The frequency comb source according to claim 1, wherein said nonlinear waveguide comprises PPLN.

5. The frequency comb source according to claim 1, wherein said nonlinear waveguide comprises a periodically poled grating section.

6. The frequency comb source according to claim 1, further comprising an optical filter disposed upstream from said optical detector, said filter substantially transmitting portions of the supercontinuum that contribute to signals representative of said beat frequencies.

7. The frequency comb source according to claim 1, wherein said pulsed output from said mode-locked fiber oscillator comprises frequency components having a repetition frequency, $f_{rep}$, and a carrier envelope offset frequency, $f_{ceo}$, said frequency comb source further comprising:
   a feedback system having an input for receiving a beat frequency related to $f_{ceo}$,
   said feedback system comprising a phase lock loop to compare said beat frequency related to $f_{ceo}$ with a reference frequency,
   said feedback system connected to said mode-locked fiber oscillator to control said carrier envelope offset frequency, $f_{ceo}$, based on said beat frequencies.

8. The frequency comb source according to claim 1, said frequency comb source further comprising optical comb lines characterized by a repetition frequency, $f_{rep}$, and a carrier envelope offset frequency, $f_{ceo}$, said frequency comb source further comprising:
   a first feedback system configured to lock at least one of the optical comb lines to an optical frequency reference.

9. The frequency comb source according to claim 8, further comprising a second feedback system configured to control $f_{ceo}$.

10. The frequency comb source according to claim 9, wherein said second feedback system configured to control $f_{ceo}$ is configured to adjust a pump power for the modelocked fiber oscillator.

11. The frequency comb source according to claim 8, further comprising an electro-mechanical transducer configured to controllably alter the cavity length of said optical cavity in response to a signal in the first feedback system.

12. The frequency comb source according to claim 1, wherein said pulsed output from said mode-locked fiber oscillator comprises frequency components having a repetition frequency, $f_{rep}$, and a carrier envelope offset frequency, $f_{ceo}$,
   said optical cavity comprising an addressable intra-cavity element,
   said frequency comb source further comprising a feedback system connected to said mode-locked fiber oscillator and said addressable intra-cavity element to control said carrier envelope offset frequency, $f_{ceo}$,
   said addressable intra-cavity element configured to perturb said mode-locked fiber oscillator in response to feedback from said feedback system.

13. The frequency comb source according to claim 12, wherein said addressable intra-cavity element comprises a heating element, an electro-mechanical transducer, or a piezo-electric transducer.

14. The frequency comb source according to claim 1, wherein:
   said frequency comb source is substantially fiber based, said non-linear optical element comprises a highly non-linear fiber, and said frequency comb source comprises coupling fibers that are spliced to the highly non-linear fiber so as to couple said supercontinuum from the highly non-linear fiber to the nonlinear waveguide.

15. The frequency comb source according to claim 1, wherein said frequency comb source is substantially fiber based, and said frequency comb source comprises a coupling fiber attached to the non-linear waveguide for output coupling the output of said non-linear waveguide.

16. The frequency comb source according to claim 1, wherein said optical fiber disposed in said cavity has a total length L, and said mode-locked fiber oscillator has a total dispersion in the range from −10,000 femtosec$^2$/m×L to +2,500 femtosec$^2$/m×L.

17. The frequency comb source according to claim 1, wherein said mode-locked fiber oscillator has a total absolute dispersion less than about 5,000 femtosec$^2$.

18. The frequency comb source according to claim 1, wherein said nonlinear optical element is fiber based and has a dispersion in the range from −5,000 femtosec$^2$/m to +2,000 femtosec$^2$/m.

19. The frequency comb source according to claim 1, wherein said optical cavity of said mode-locked fiber oscillator is configured with sufficiently low cavity dispersion such that a carrier envelope offset frequency beat signal ($f_{ceo}$ beat signal) having a frequency bandwidth smaller than approximately 200 kHz is obtainable from said frequency comb source.

20. The frequency comb source according to claim 1, further comprising a fiber amplifier disposed between said mode-locked fiber oscillator and said non-linear optical element.

21. The frequency comb source according to claim 18, further comprising an isolator disposed between said mode-locked fiber oscillator and said fiber amplifier.

22. The frequency comb source according to claim 1, wherein said interferometer comprises a group delay compensator configured to compensate for a difference in optical path between said at least a portion of said first train and second train of optical pulses interfering in said interferometer, said group delay compensator configured to reduce said optical path difference.

23. A frequency comb source comprising:
a mode-locked fiber oscillator comprising a least two optical fibers with different dispersion characteristics disposed in an optical cavity and arranged such that said mode-locked cavity dispersion is in the range from −10,000 femtosec$^2$/m×L to +2,500 femtosec$^2$/m×L where L is the total intra-cavity fiber length, said mode-locked fiber oscillator configured to output pulses having a carrier envelope offset frequency $f_{ceo}$;

a non-linear optical element disposed downstream from said mode-locked fiber oscillator configured to receive pulses originating from said mode-locked fiber oscillator to generate a supercontinuum; and an interferometer configured to generate a beat signal representative of the $f_{ceo}$ of said mode-locked fiber oscillator.

24. The frequency comb source according to claim 23, further comprising a polarization-maintaining fiber amplifier.

25. The frequency comb source according to claim 24, said fiber amplifier configured to be operated in a nonlinear regime such that said pulses are subject to substantial levels of self-phase modulation, producing spectral broadening in the output from the fiber amplifier.

26. The frequency comb source according to claim 25, further comprising a compressor downstream of said fiber amplifier, said compressor comprising step-index fiber.

27. The frequency comb source according to claim 26, wherein said compressor is configured to generate pulses with a width of less than approximately 200 fs, to preserve coherence in supercontinuum generation.

28. The frequency comb source according to claim 26, wherein said compressor is configured to generate pulses with a width of less than approximately 100 fs, to preserve coherence in supercontinuum generation.

29. The frequency comb source according to claim 26, wherein said compressor is configured to generate pulses with a width of less than approximately 70 fs, to preserve coherence in supercontinuum generation.

30. The frequency comb source according to claim 23, wherein said mode-locked fiber oscillator comprises a fiber pig-tailed cavity component.

31. The frequency comb source according to claim 23 wherein at least one of said mode-locked fiber oscillator or said nonlinear optical element comprises polarization maintaining fiber.

32. The frequency comb source according to claim 23, wherein said beat signal representative of said $f_{ceo}$ of said mode-locked fiber oscillator has a spectral width of less than approximately 200 kHz.

33. The frequency comb source according to claim 23, wherein said mode-locked fiber oscillator has a total absolute dispersion less than about 5,000 femtosec$^2$.

34. The frequency comb source according to claim 23, wherein said nonlinear optical element is fiber based and has a dispersion in the range from −5,000 femtosec$^2$/m to +2,000 femtosec$^2$/m.

* * * * *